United States Patent [19]

Kobayashi et al.

[11] Patent Number: 5,030,979
[45] Date of Patent: Jul. 9, 1991

[54] ELECTRONICALLY CONTROLLED CAMERA

[75] Inventors: Takeo Kobayashi, Tokyo; Yasushi Tabata, Ichikawa; Norio Numako, Nogi; Katsuotoshi Nagai, Kawaguchi, all of Japan

[73] Assignee: Asahi Kogaku Kogyo Kabushiki Kaisha, Tokyo, Japan

[21] Appl. No.: 387,980

[22] Filed: Aug. 1, 1989

[30] Foreign Application Priority Data

Aug. 1, 1988 [JP] Japan .............................. 63-102115[U]
Aug. 19, 1988 [JP] Japan .............................. 63-108998[U]
Aug. 25, 1988 [JP] Japan .............................. 63-111412[U]

[51] Int. Cl.⁵ .................................................. G03B 7/00
[52] U.S. Cl. ........................................ 354/21; 354/412
[58] Field of Search ................ 354/21, 266, 268, 269, 354/412, 267.1, 286

[56] References Cited

U.S. PATENT DOCUMENTS

| | | | |
|---|---|---|---|
| 4,423,934 | 1/1984 | Lambeth et al. | 354/412 |
| 4,629,304 | 12/1986 | Saegusa | 354/289.12 |
| 4,692,005 | 9/1987 | Takami | 354/21 |
| 4,841,327 | 6/1989 | Yamamoto et al. | 354/412 |
| 4,853,733 | 8/1989 | Watanabe et al. | 354/412 |
| 4,857,951 | 8/1989 | Nakajima et al. | 354/400 |
| 4,860,113 | 8/1989 | Miyamoto et al. | 354/286 |
| 4,887,105 | 12/1989 | Ishikawa et al. | 354/21 |
| 4,945,365 | 7/1990 | Fujino | 354/21 |

FOREIGN PATENT DOCUMENTS 60-225122 11/1985 Japan .

*Primary Examiner*—L. T. Hix
*Assistant Examiner*—David M. Gray
*Attorney, Agent, or Firm*—Sandler, Greenblum, & Bernstein

[57] ABSTRACT

An electronically controlled camera which is controllable by an external control unit connected to terminals provided on a camera body. The terminals are connected to signal lines arranged between more than one control unit built in the camera body. One sends a predetermined unrequired data to the other one of the control units through the predetermined signal line. This data is externatlly monitored. Furthermore, predetermined photographing data is indicated on an indicator unit of the camera under predetermined conditions.

23 Claims, 21 Drawing Sheets

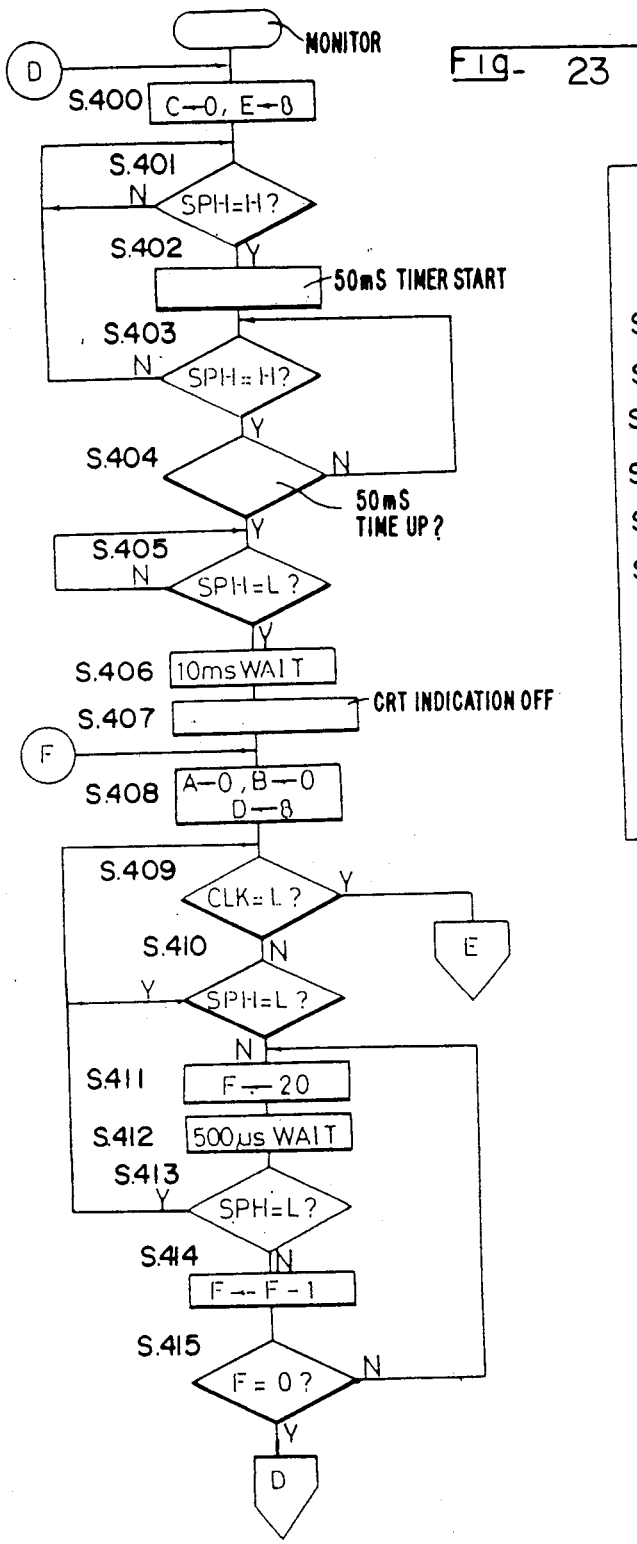
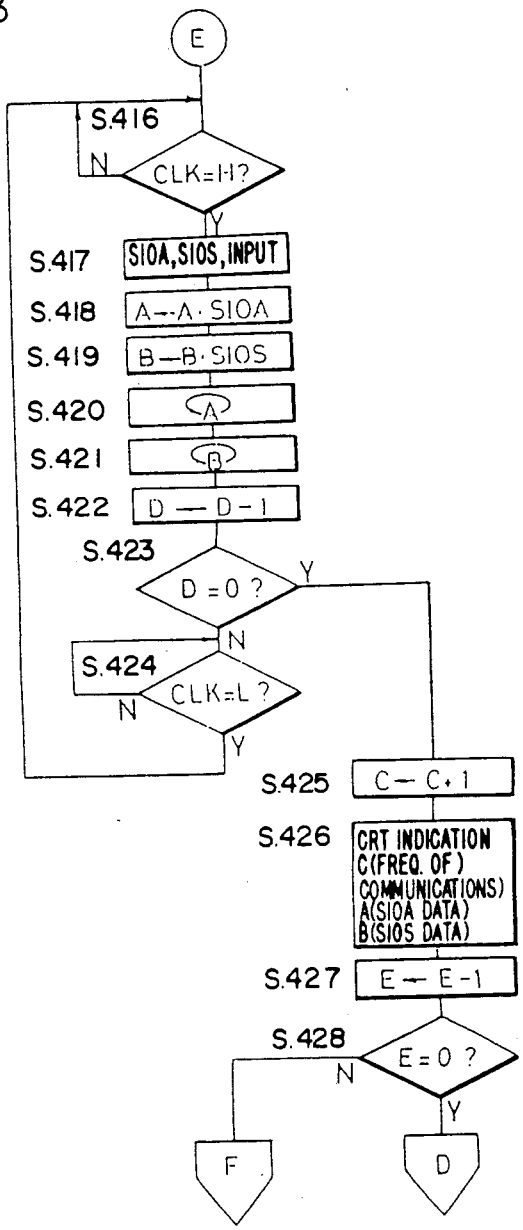
Fig. 23

ELECTRONICALLY CONTROLLED CAMERA

BACKGROUND OF THE INVENTION

The present invention relates to an electronically controlled camera.

Modern day electronically controlled cameras incorporate a CPU (Central Processing Unit). In electronically controlled cameras of this type, the CPU executes the controls required for camera operation, such as light intensity measurement, distance measurement, zoom lens driving, film winding, rewinding, and indication control of a LCD (Liquid Crystal Display) panel.

Taking an example of zoom lens movement, when a TELE switch is operated, a zoom motor is rotated forward to pull a zoom lens toward a TELE extremity, while when a WIDE switch is operated, the zoom motor is rotated in a reverse direction to withdraw the zoom lens to a WIDE extremity. Also, when a main switch is operated after a back cover is closed with a film cartridge seated inside the camera, an automatic loading operation takes place executing a blank-shot film advancing operation.

Furthermore, each time a shutter is operated, a film frame is automatically pulled out of the film cartridge. When a certain number of film frames have been advanced, a wind-up motor is reverse rotated to automatically rewind the film into the film cartridge.

The shutter speed, a number of film frames taken, lens focal length and battery capacity are generally indicated on the LCD panel. A viewfinder indicates a strobe flash mode by illuminating a red lamp; a strobe charge is indicated by the red lamp blinking; a focus lock is displayed by illuminating a green lamp; and a short distance warning is indicated by the green lamp blinking.

When fabricating and inspecting the camera of this type, it is necessary to perform inspections to check whether the camera is able to carry out the desired operations. In such operation checks, it has been necessary to actually use the camera, or to start a dedicated operation test program which has been previously stored in the CPU. Extensive labor is thus required for inspection purposes, which is not desirable in view of the costs involved.

SUMMARY OF THE INVENTION

Accordingly, an object of the present invention is to provide an improved electronically controlled camera that can be easily inspected.

In order to achieve the foregoing object, according to one aspect of the invention, there is provided an electronically controlled camera, comprising:

means for controlling a camera function;

means for inputting a control signal to said control means; and terminal means, to which an external controller is connected for inputting an external control signal to said control means;

wherein said control means disables said input means when said external control signal is inputted through said terminal means and controls said camera functions in accordance with said external control signal via said control means.

According to another aspect of the invention, there is provided an electronically controlled camera, comprising:

a plurality of control means;

a plurality of signal lines interconnected between said plurality of control means for exchanging data; and terminal means to which an external unit is connected, said terminal means being connected to one of said signal lines, wherein one of said plurality of control means sends at least one predetermined data signal to another control means through said signal lines, said data signal being the data which is not required by said other one of the control means.

According to a further aspect, there is provided an electronically controlled camera, comprising:

means for measuring photographing data that varies in dependence upon external environments;

means for reading a Dx code provided on a film cartridge;

means for detecting if a film is loaded with a leader section withdrawn from the film cartridge;

means for indicating said photographing data; and means for indicating said photographing data measured by the measuring means on the indicator means when the Dx code input means inputs a predetermined Dx code and the film detecting means detects that the film is not withdrawn from the film cartridge.

DESCRIPTION OF THE ACCOMPANYING DRAWINGS

FIGS. 1 through 4 show the external appearance of a camera embodying the present invention wherein FIG. 1 is a front view, FIG. 2 a top view, FIG. 3 a rear view, and FIG. 4 a rear view with a back cover open;

Figure 1:
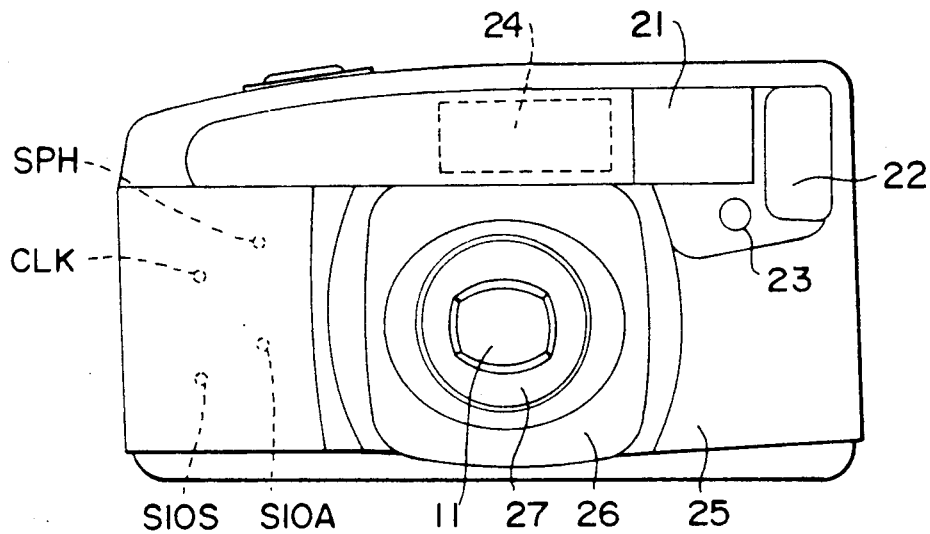
Figure 6:
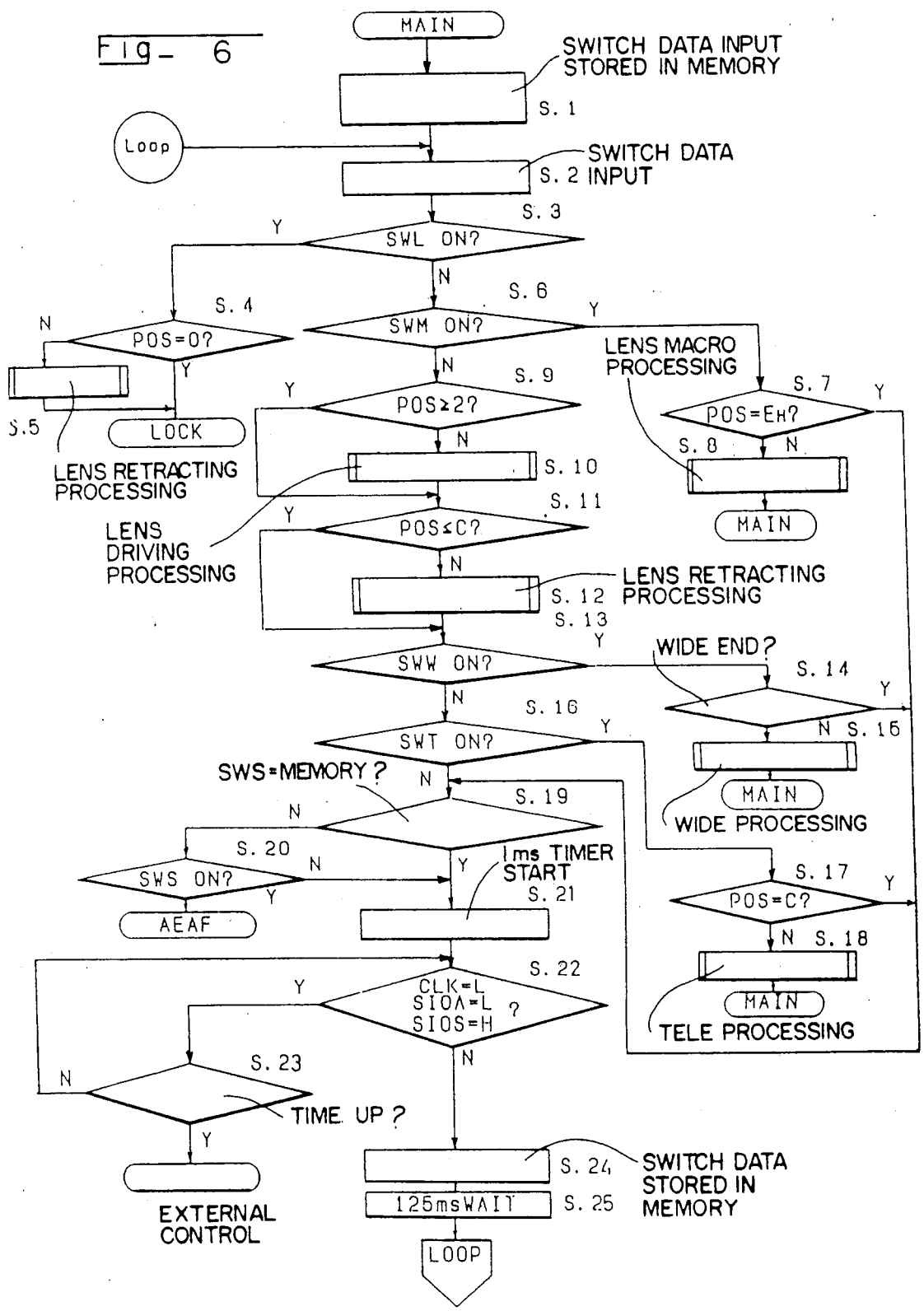
Figure 7:
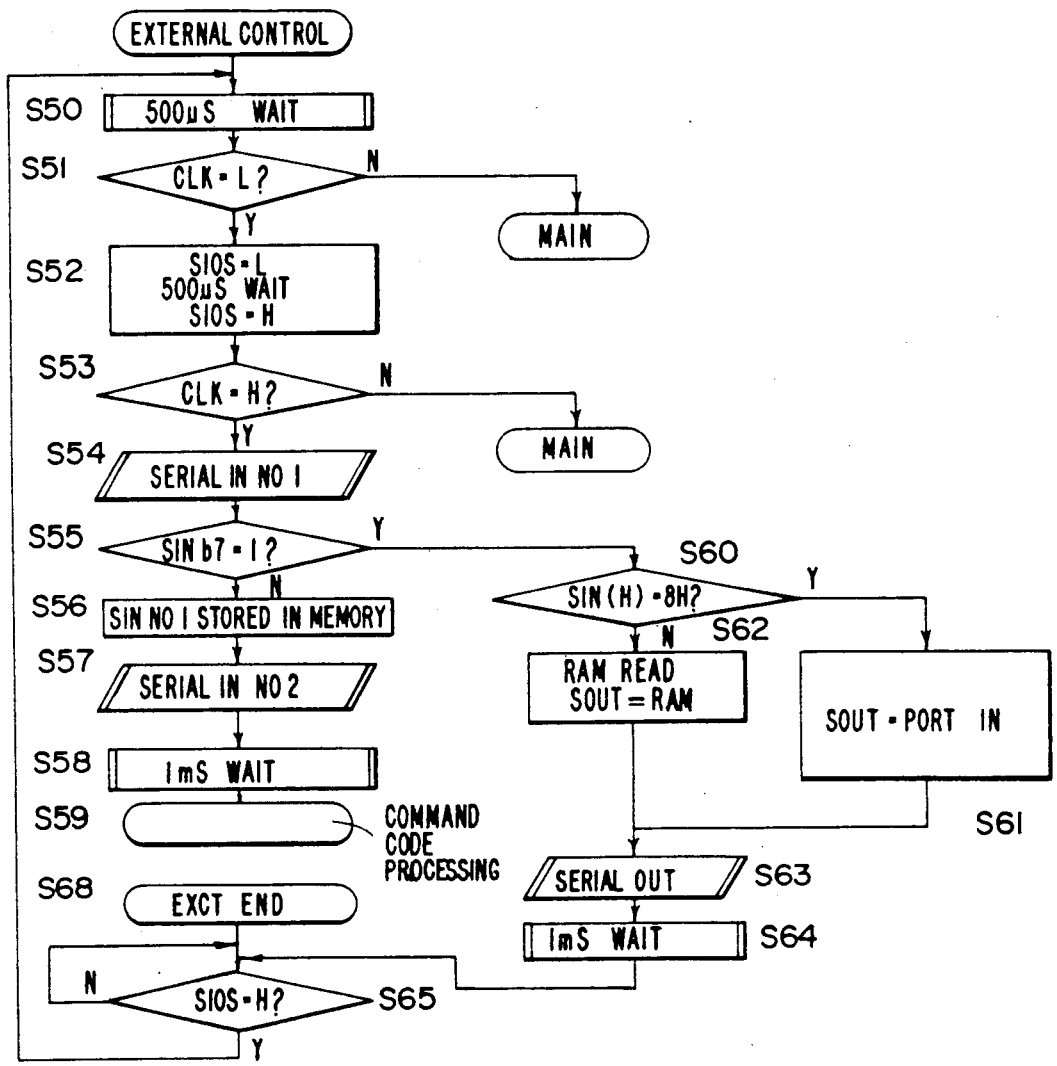
Figure 8:
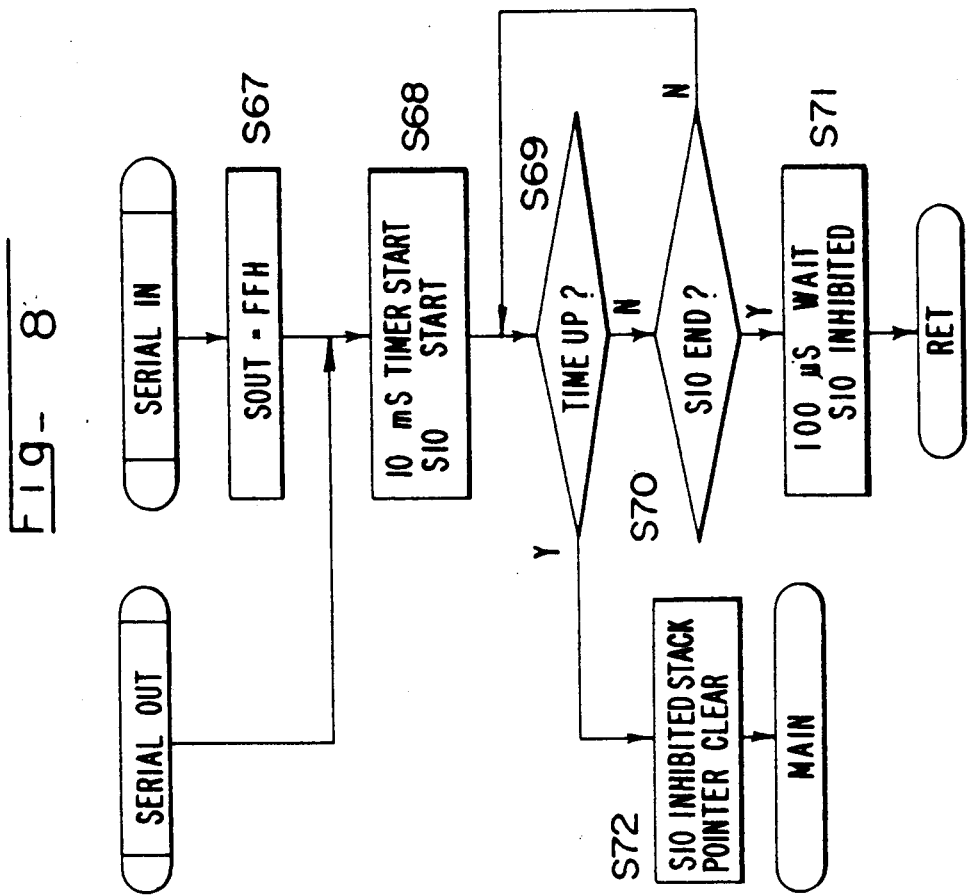
Figure 9:
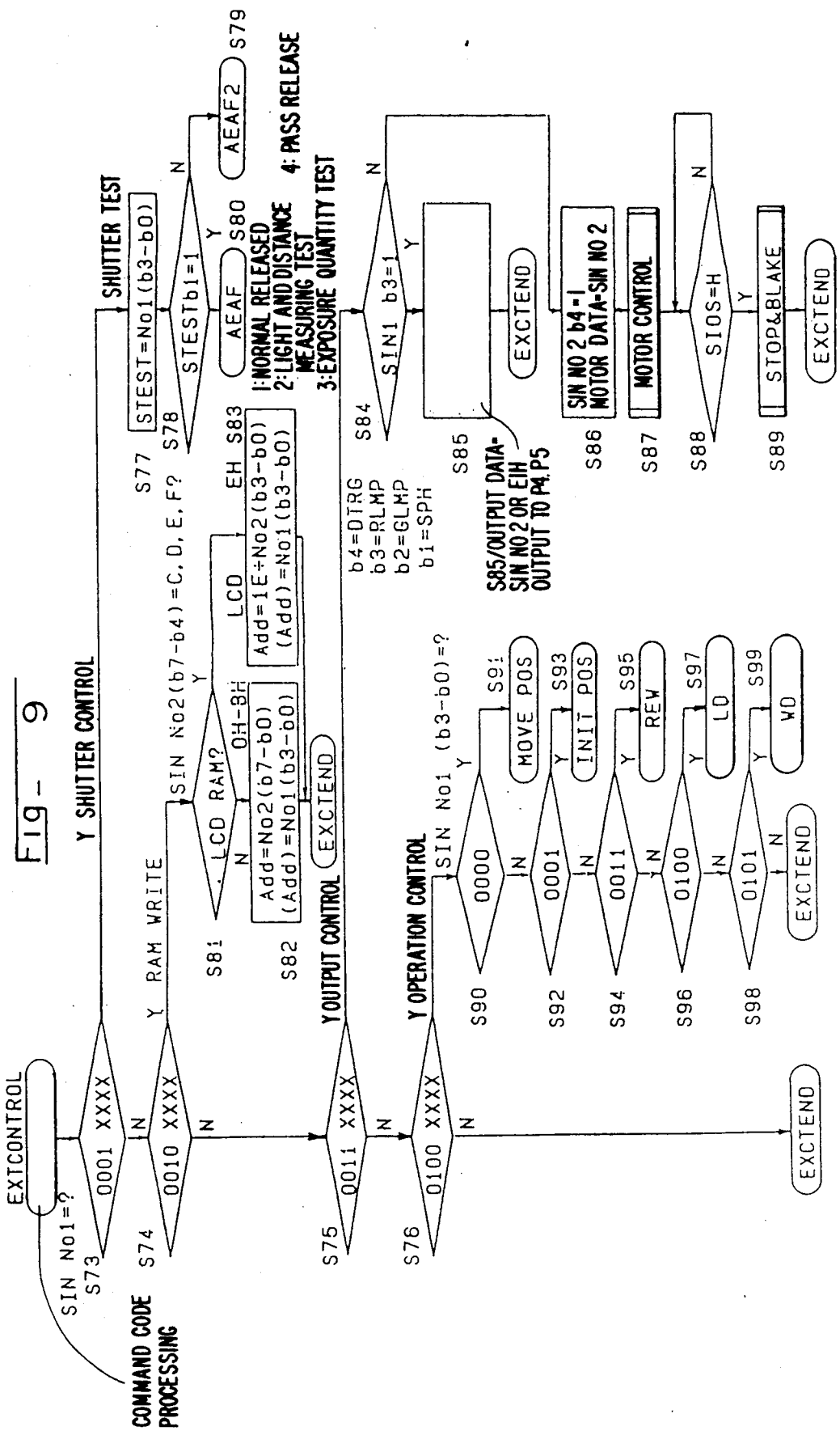
Figure 10:
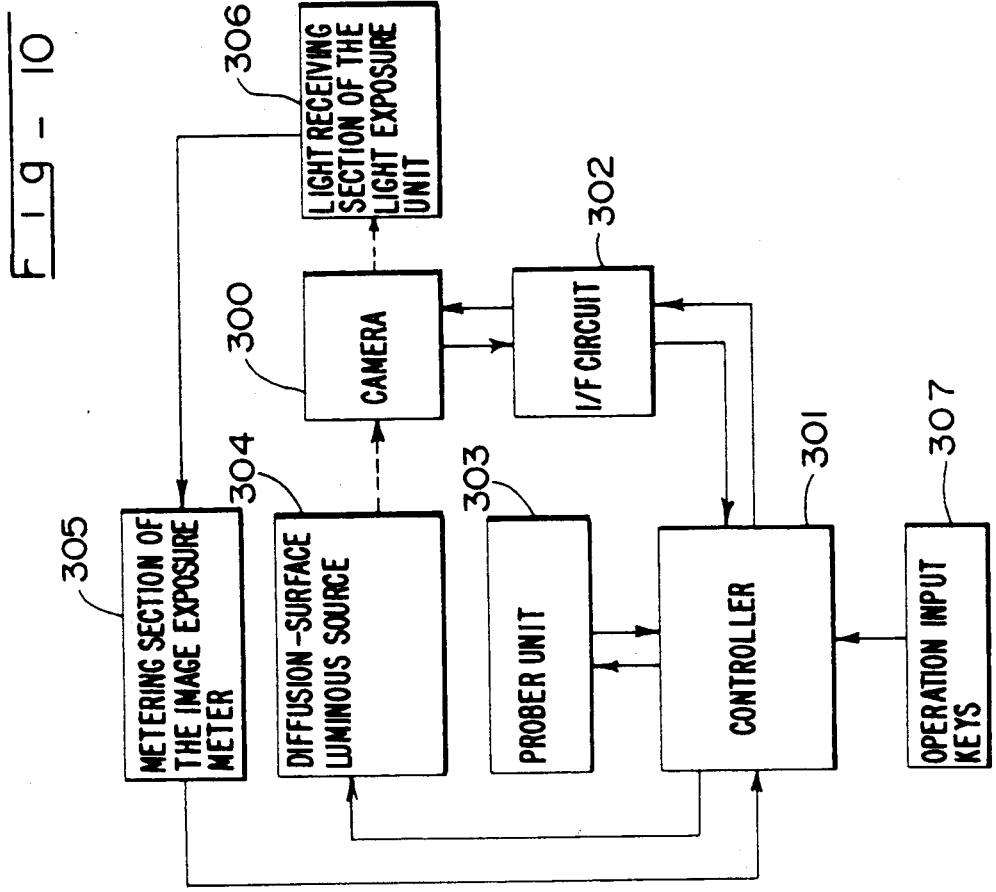
Figure 11:
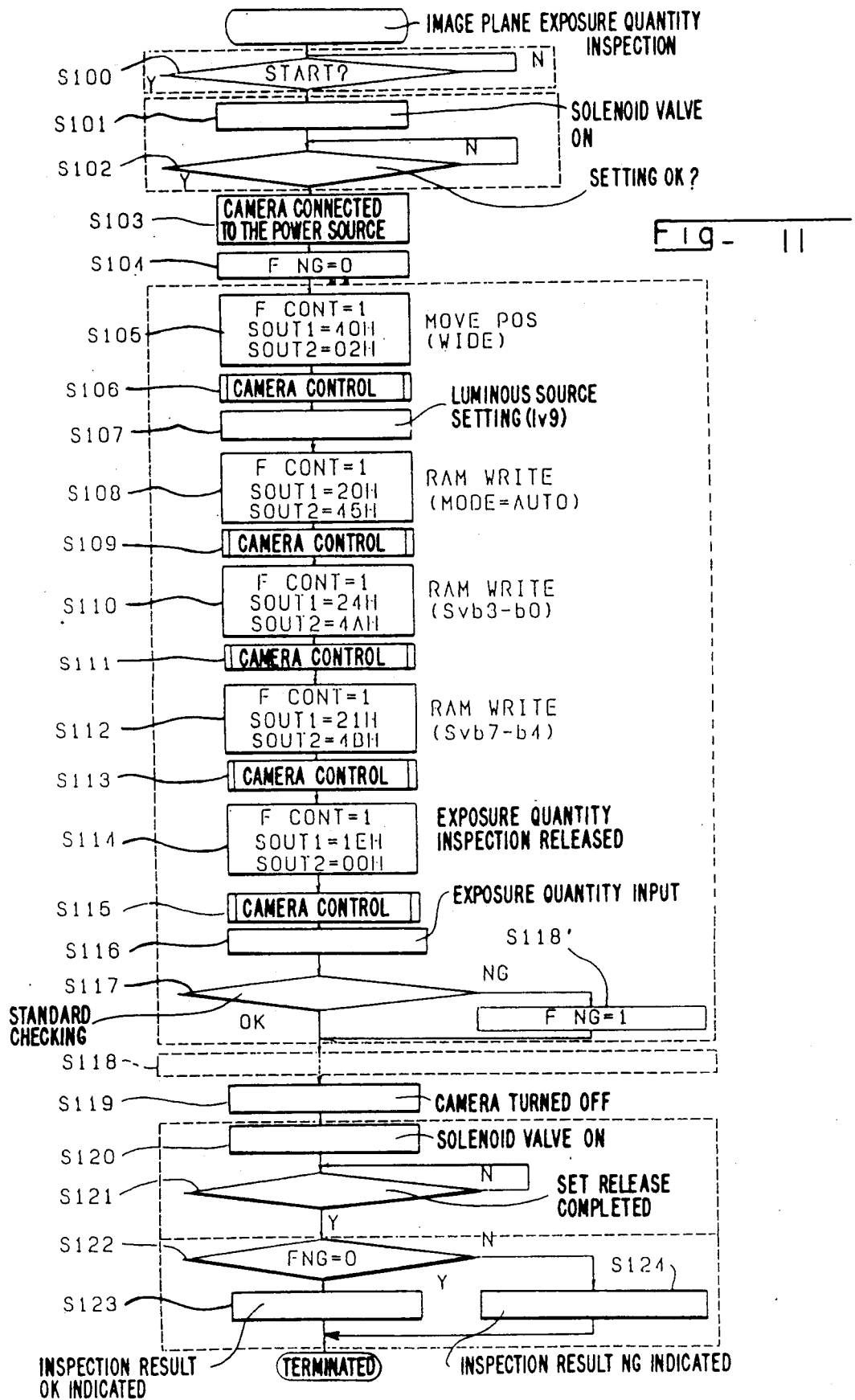
Figure 12:
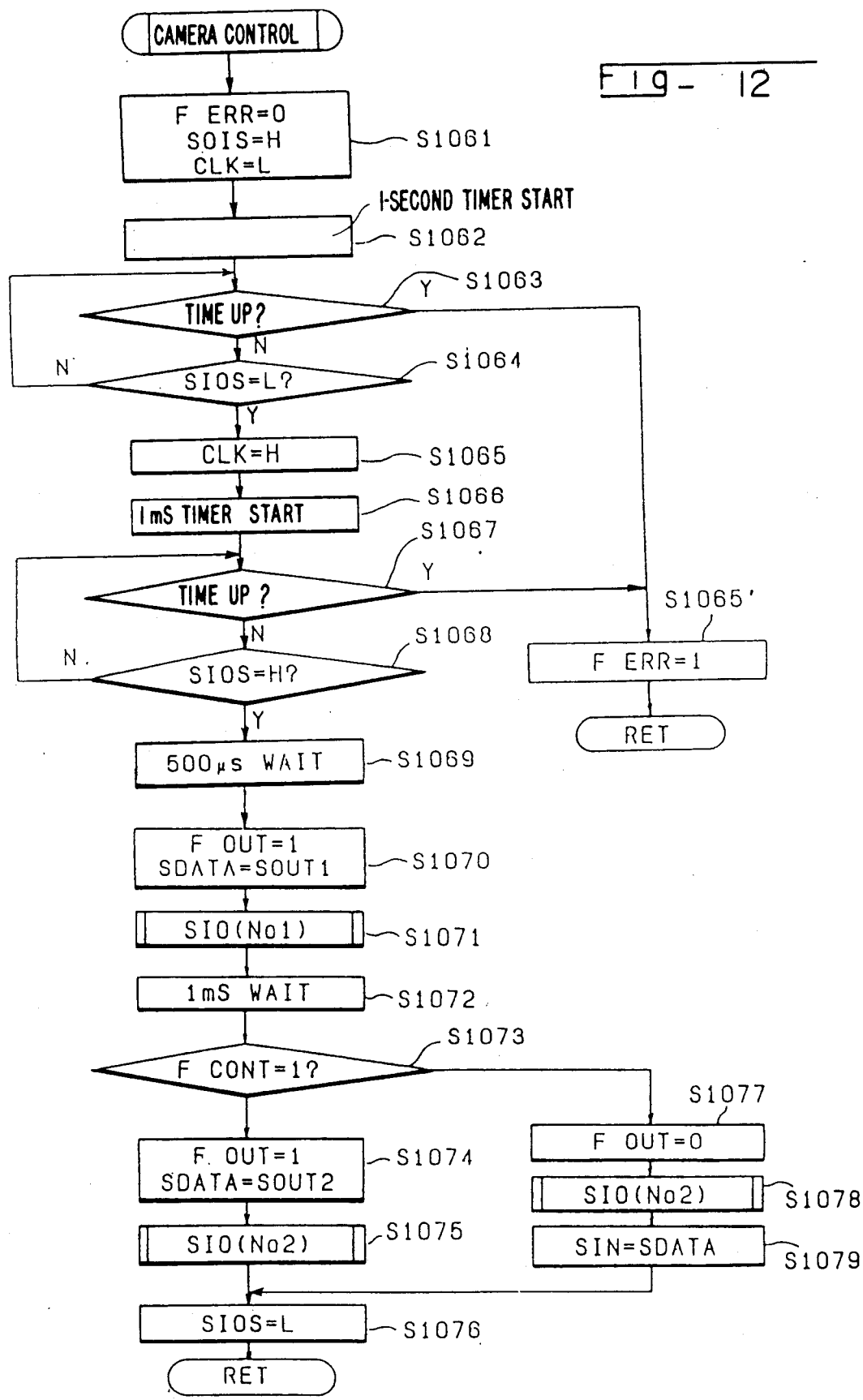
Figure 13:
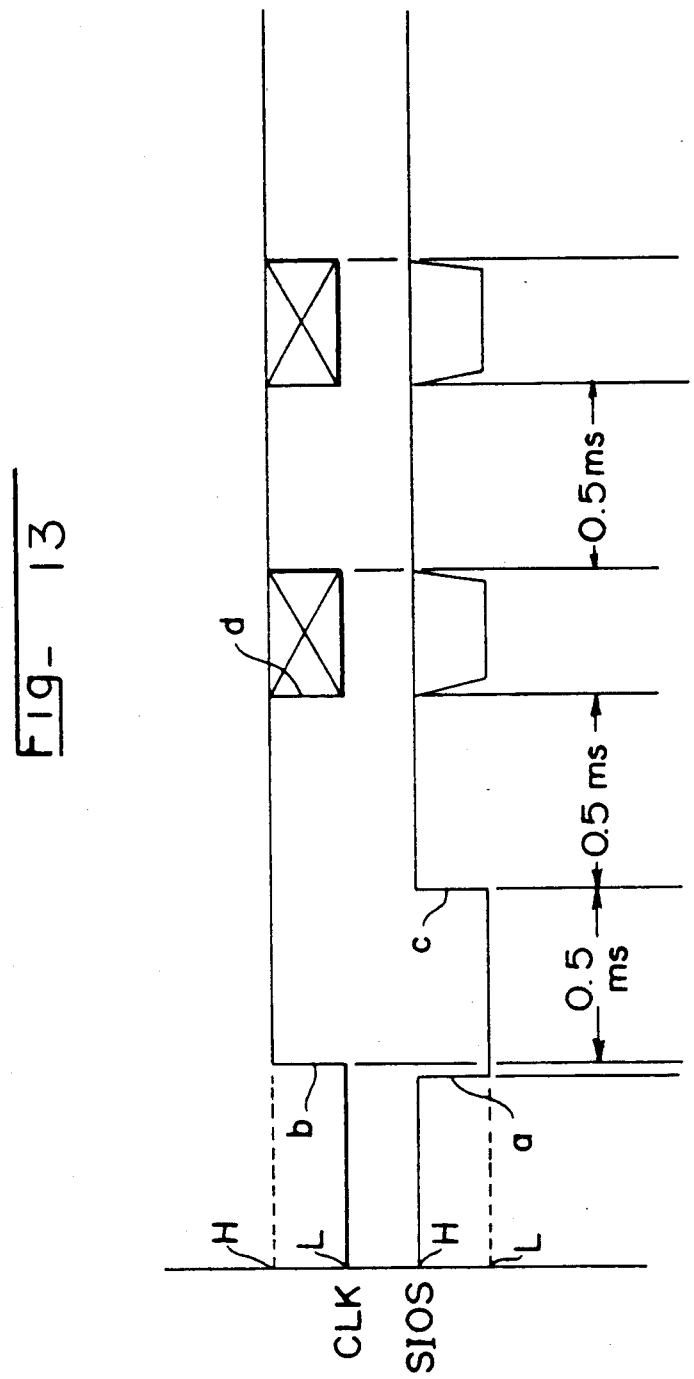
Figure 14:
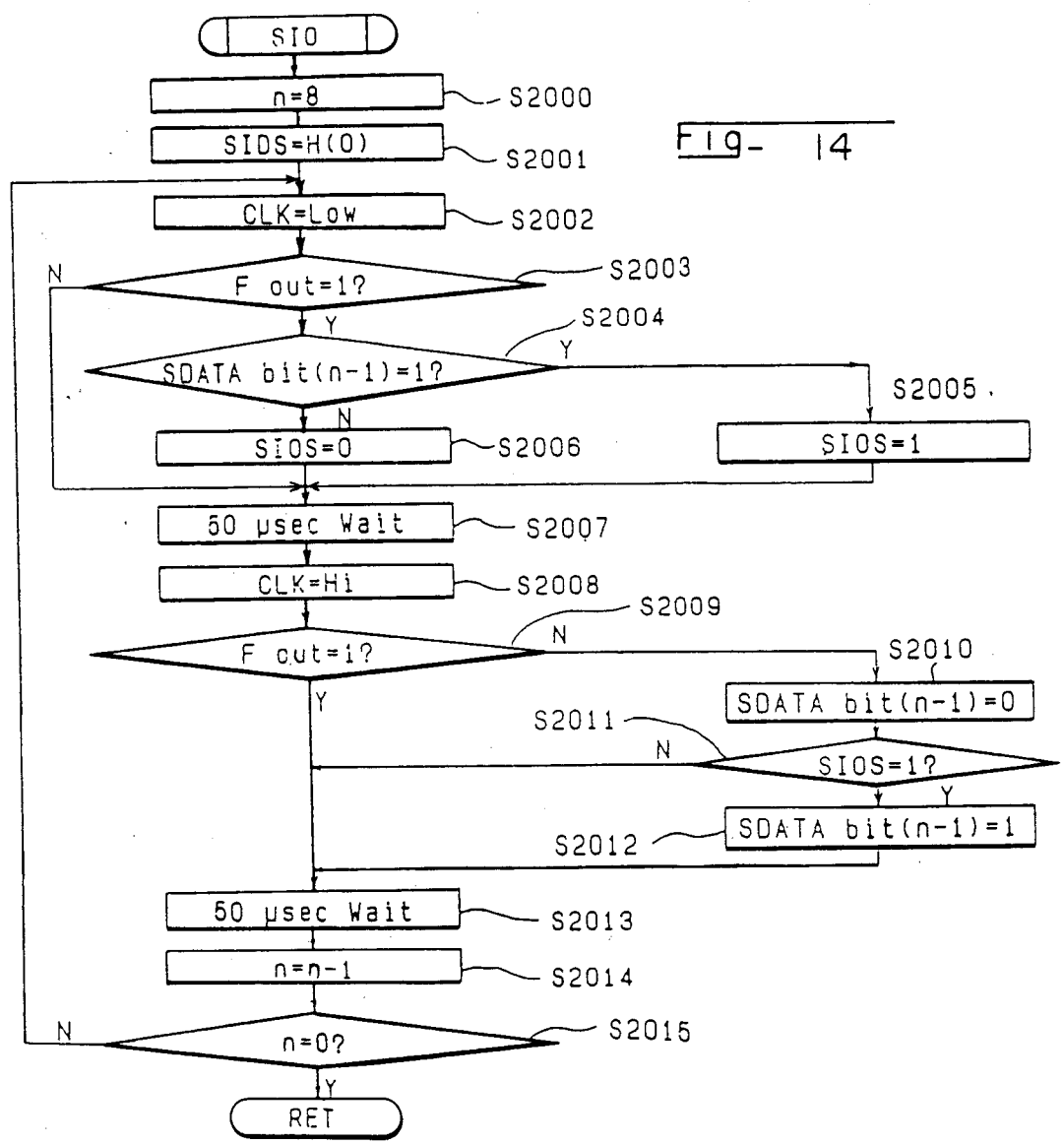
Figure 15:
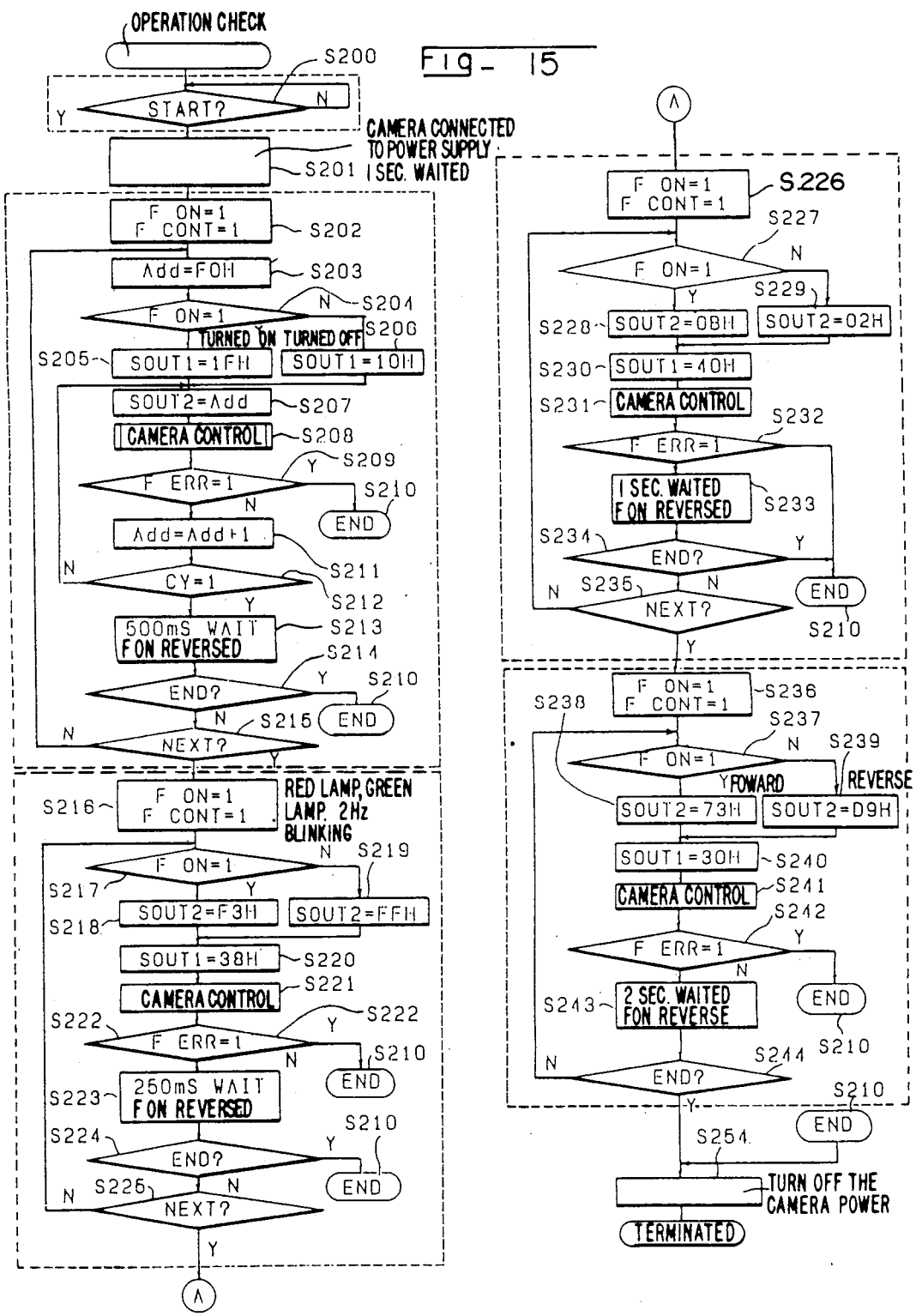
Figure 16:
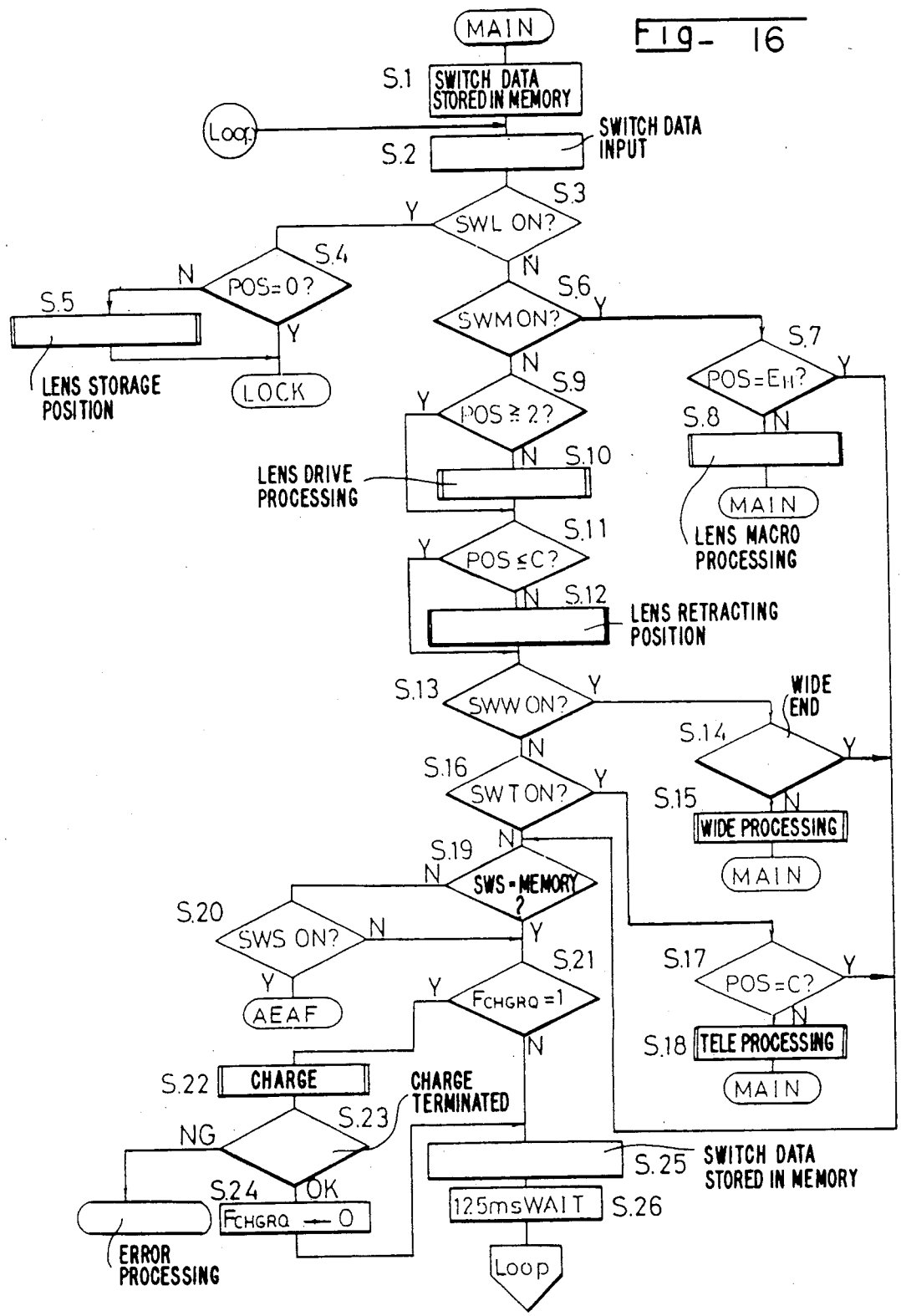
Figure 17:
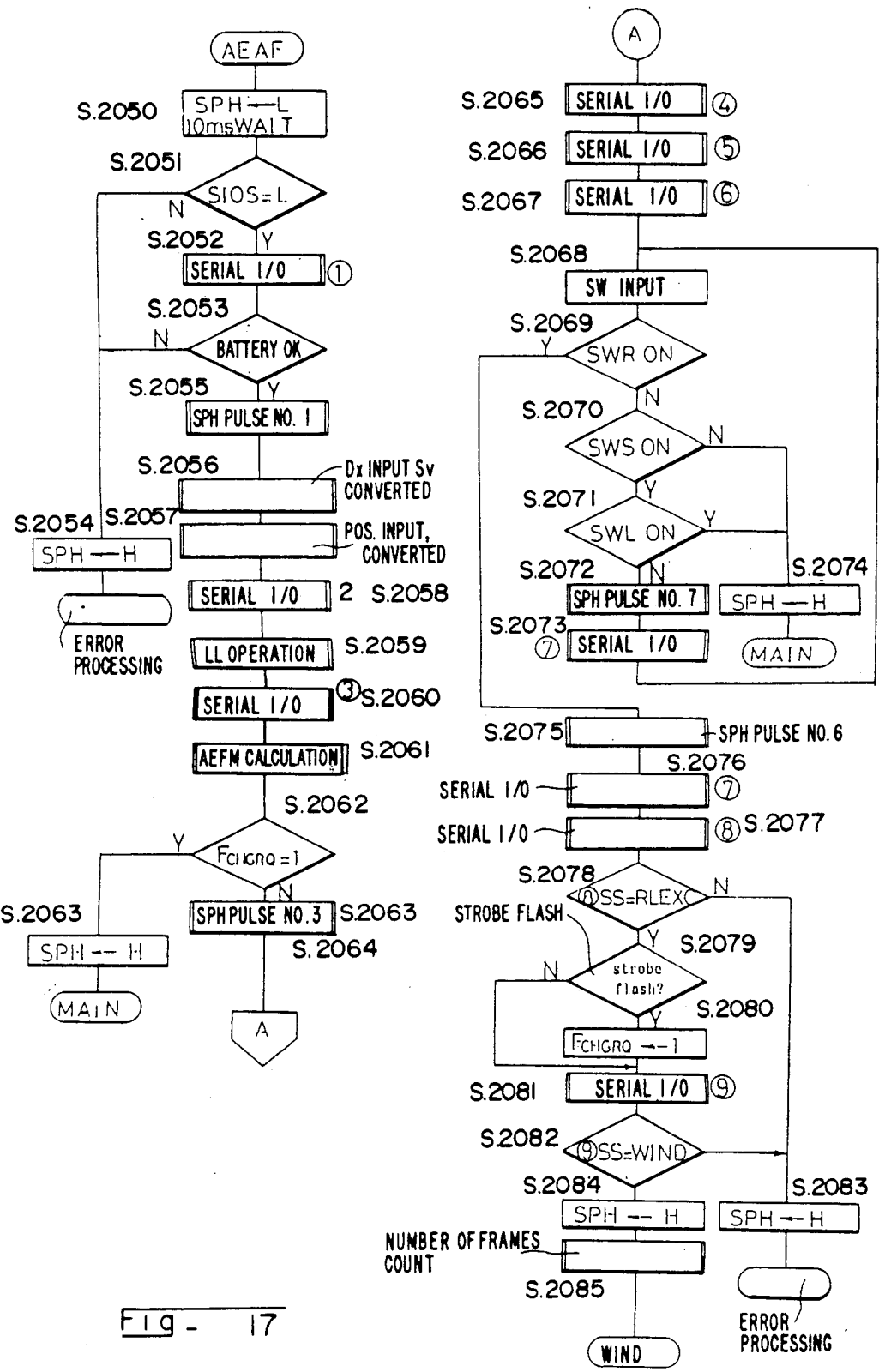
Figure 18:
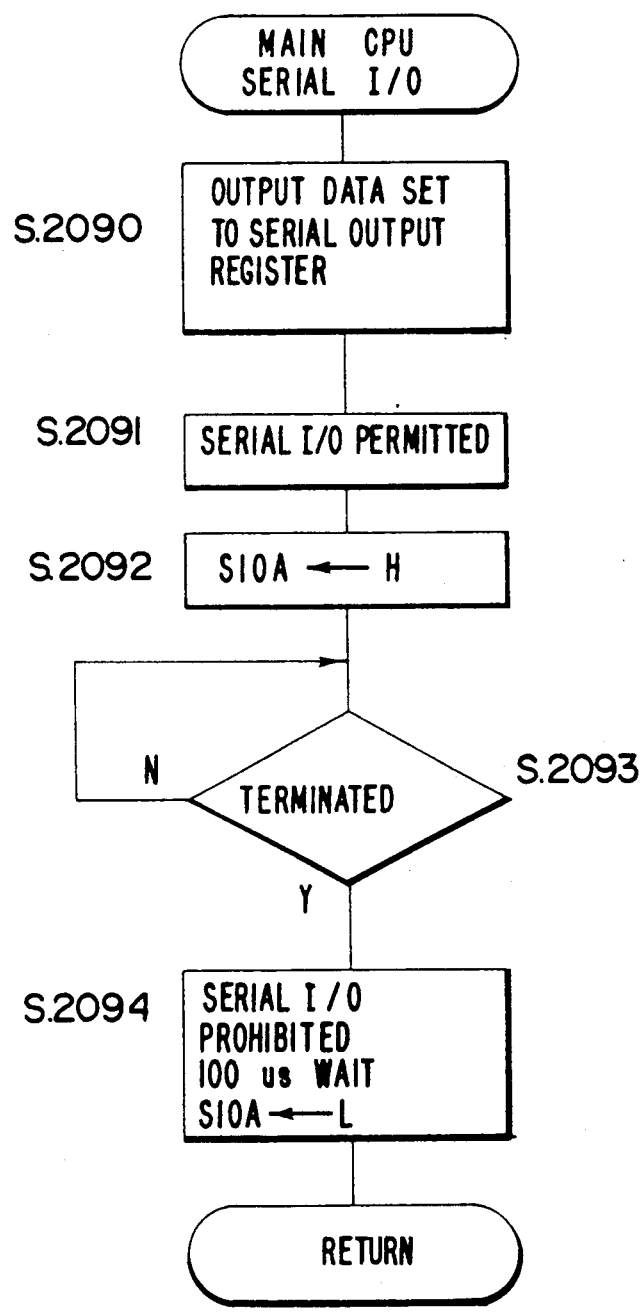
Figure 19:
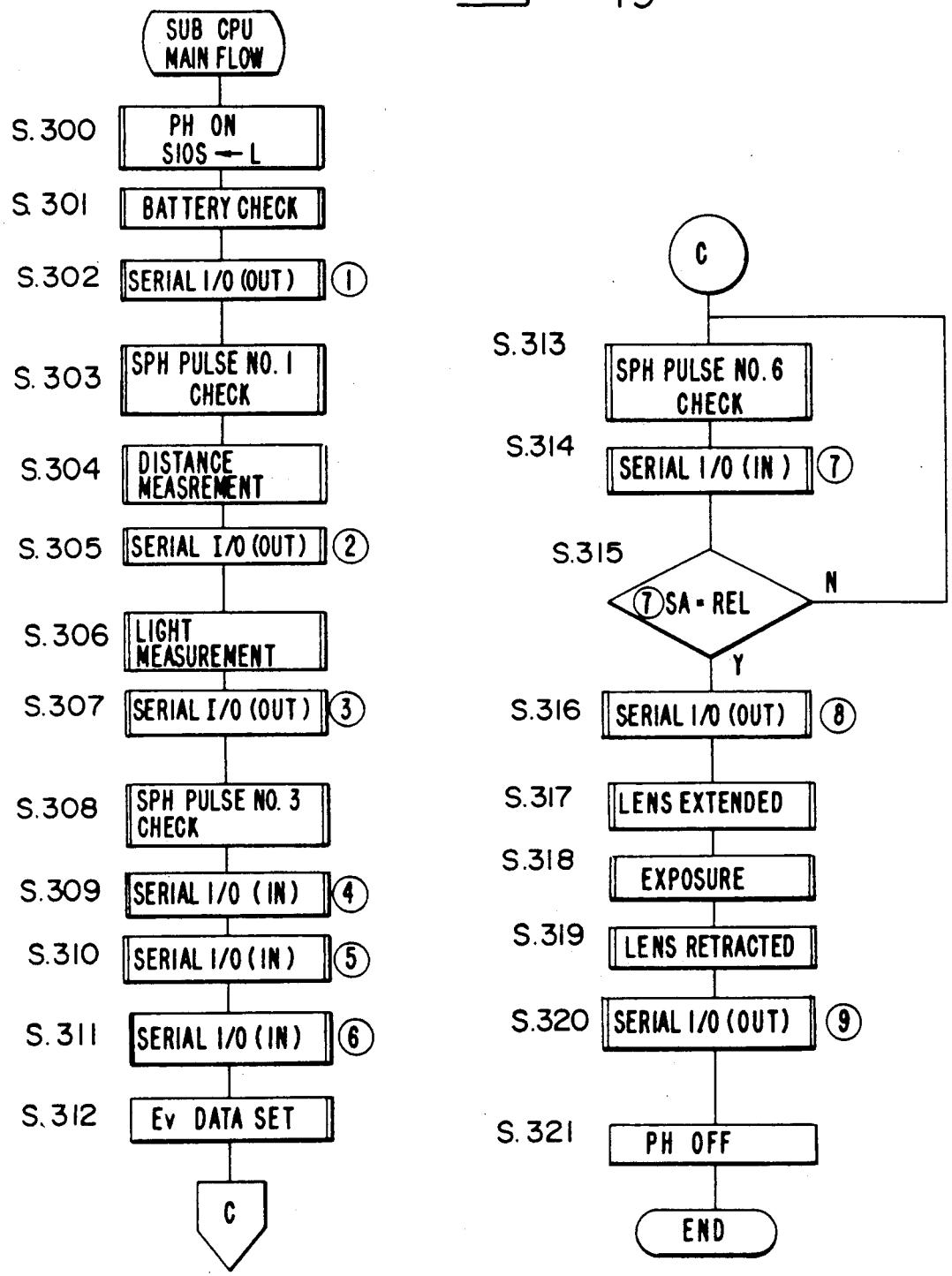
Figure 20:
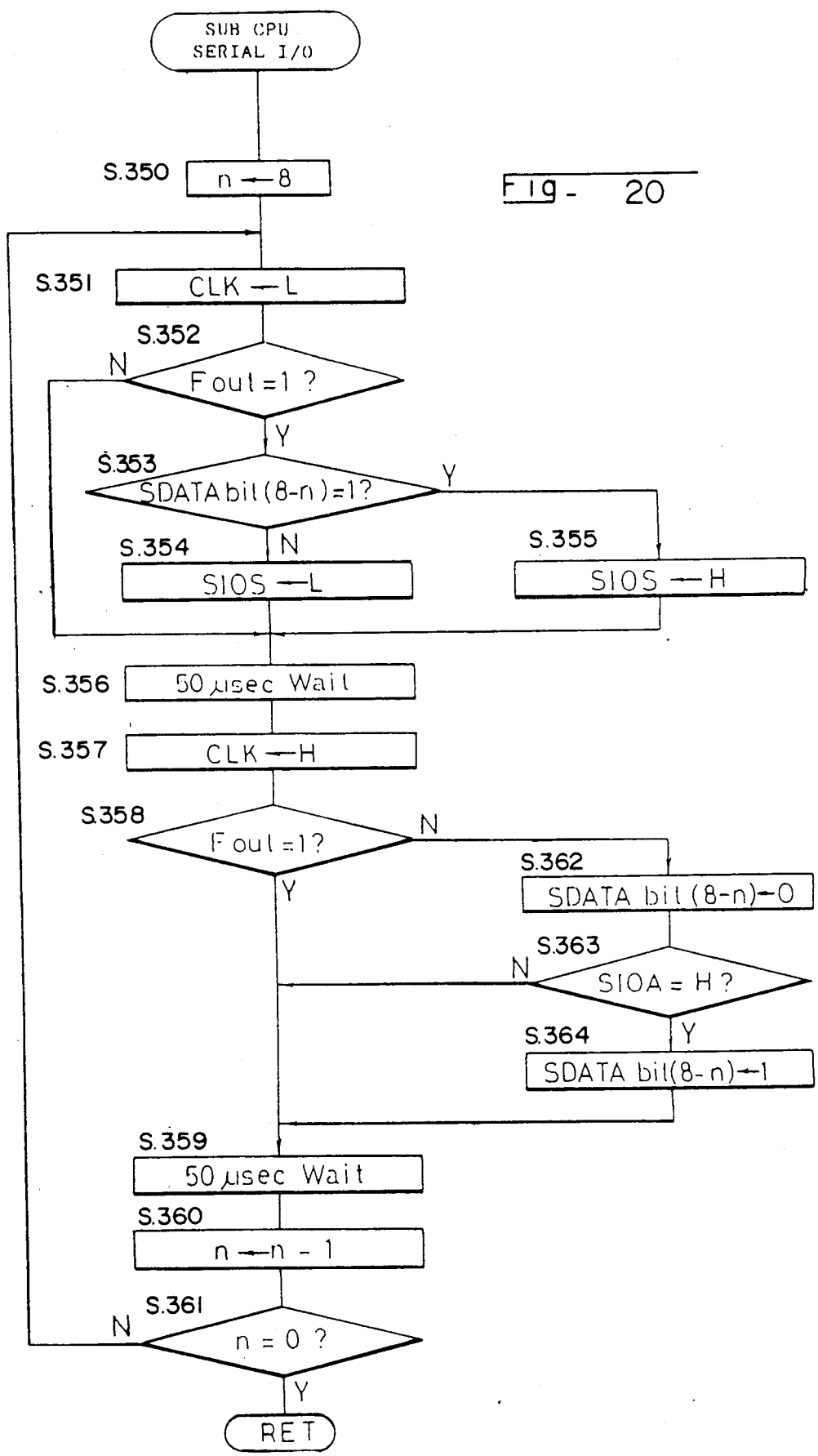
Figure 21:
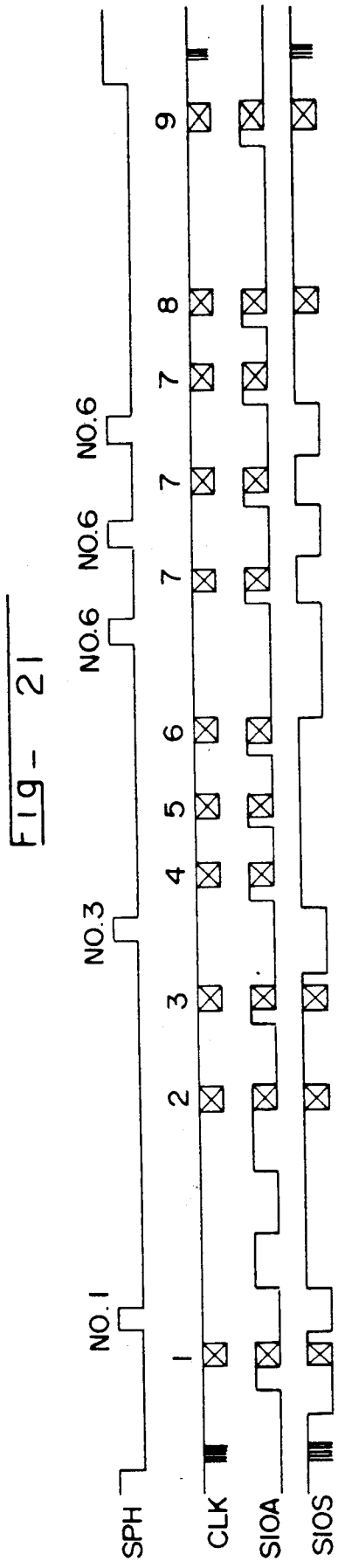
Figure 22:
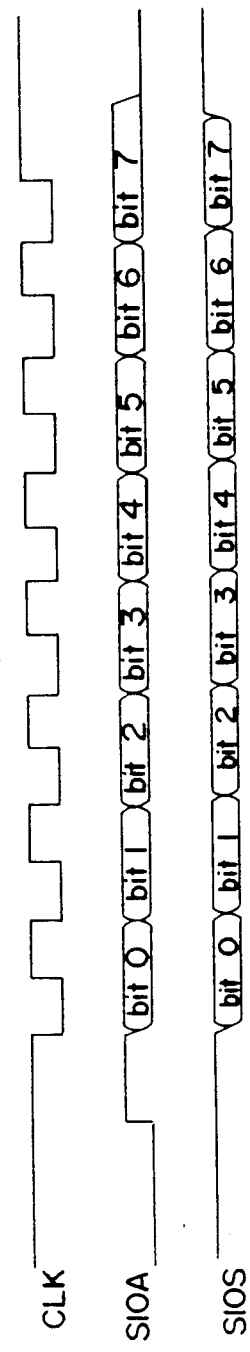

FIGS. 6 through 9 illustrate flowcharts showing the operation of a main CPU of the camera, wherein FIG. 6 illustrates a main program, FIG. 7 illustrates a flowchart of an external control operation, FIG. 8 illustrates a flowchart of a serial signal input/output subroutine, and FIG. 9 is a flowchart of a command code processing operation that diverges from the external control operation shown in FIG. 7;

FIG. 10 is a block diagram of an image plane exposure quantity inspection unit;

FIG. 11 is a flowchart of the instructions to perform the image plane exposure quantity inspection;

FIG. 12 is a flowchart of a camera control processing subroutine;

FIG. 13 illustrates a timing chart for explaining the transfer of data between the CPU of the camera and the external controller;

FIG. 14 illustrates a flowchart explaining data transfer shown in FIG. 13;

FIG. 15 is a flowchart explaining an operation check routine to inspect the camera of FIG. 1;

FIG. 16 shows a main program disclosing the instructions relating to another inspection system;

FIG. 17 illustrates a flowchart for light measuring, distance measuring and shutter-release processings;

FIG. 18 is a flowchart showing the steps for a data input/out subroutine;

FIG. 19 is a flowchart showing the operation of a sub CPU of the camera of FIG. 1;

FIG. 20 is a flowchart showing the steps for a serial signal input/output subroutine for the sub CPU;

FIGS. 21 and 22 are timing charts showing the timing of data input/output

Figure 24:
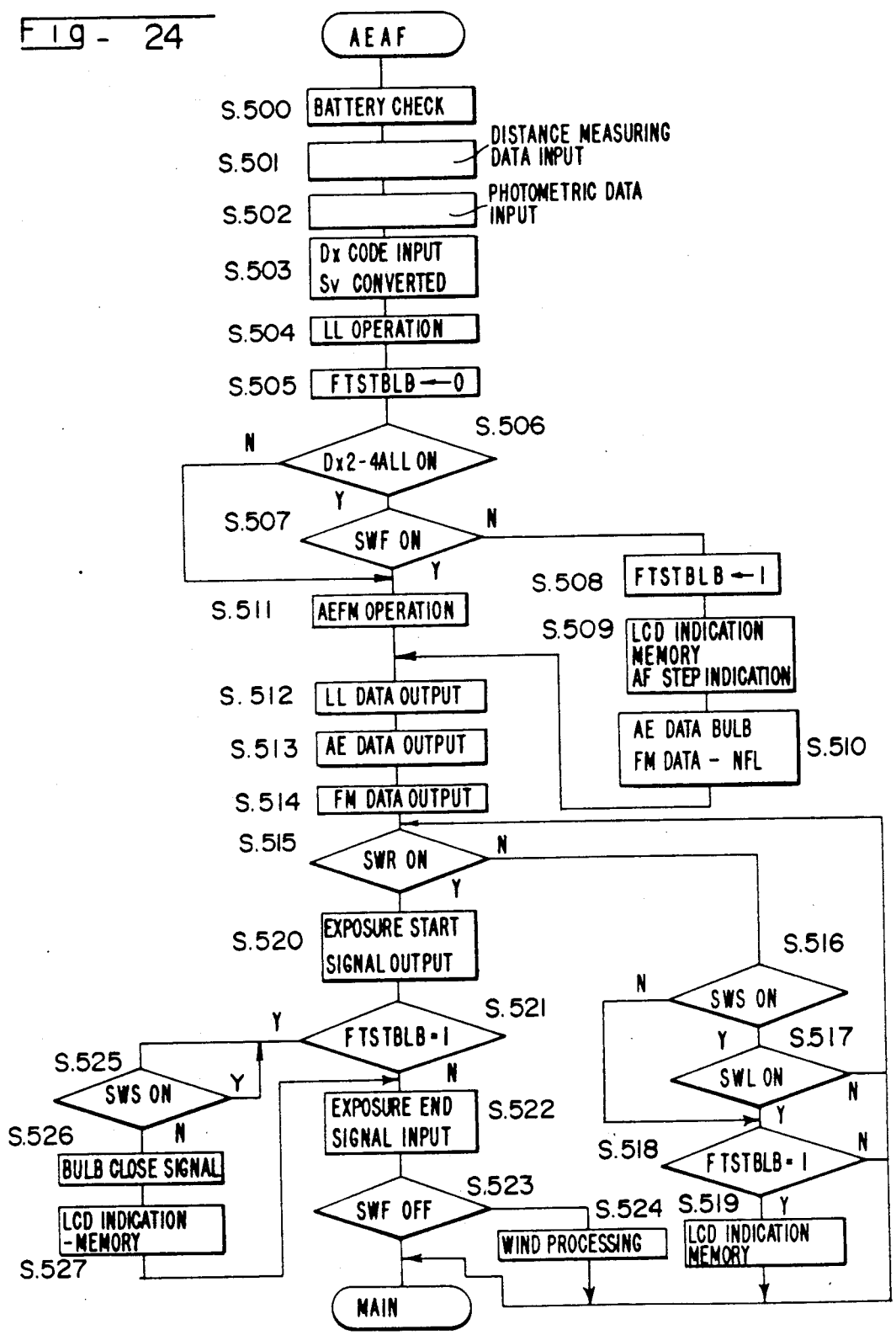

FIG. 23 is a flowchart illustrating the operation of a monitor unit for inspecting the camera shown in FIG. 1; and FIG. 24 shows an AEAF flow relating to the third inspection system.

DESCRIPTION OF THE EMBODIMENTS

The camera illustrated in FIGS. 1 through 4 comprises a compact lens shutter camera in which a taking lens (zoom lens) 11 and finder system 21 are independently installed. A strobe 22, photometric CdS cell 23, and distance measurement unit 24 are located on the front of the camera. The taking lens 11 is supported by a movable lens barrel 27, which moves as required, and is installed in a fixed lens barrel 26 secured to camera body 25.

Located inside the camera body 25 proximate a grip part of a surface cover, as shown on the left of FIG. 1, are four terminals, SPH, CLK, SIOA and SIOS, which are provided for external connection and are explained later.

Figure 2:
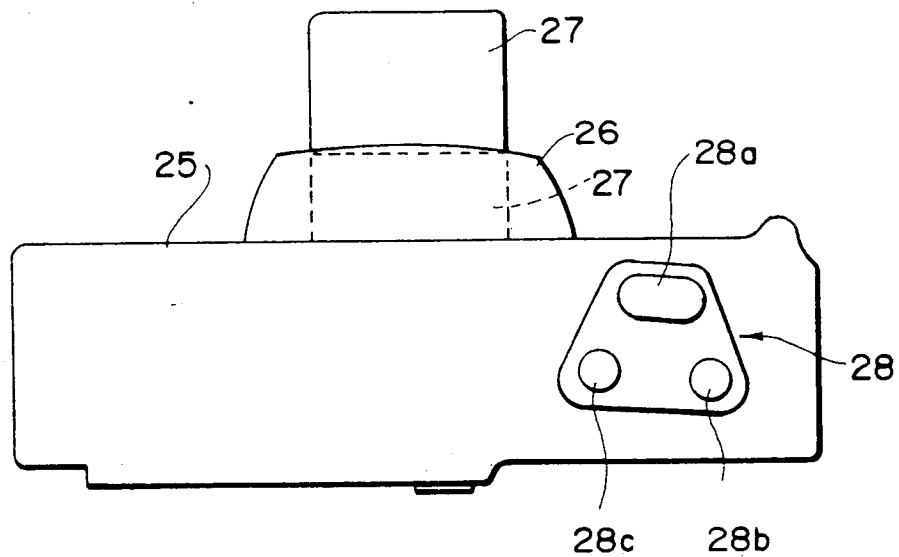

The position of the movable lens barrel 27 changes between a retracted position, illustrated by the broken line in FIG. 2, and an extended position, illustrated by the solid line in FIG. 2, to vary the focal length of the taking lens 11.

Located on the top of the camera is a shutter button 28 which is also used as a zoom button. The shutter button 28 has a triangular shape having three switches 28a, 28b and 28c. The front switch 28a is a two-step switch incorporating a photometric switch SWS and a shutter release switch SWR which will be described later. One rear switch 28b comprises a zoom-tele switch SWT and the other rear switch 28c comprises a zoom-wide switch SWW. These three switches 28a, 28b and 28c can be operated independently so that, when one of them is in operation, the other two cannot be operated.

Figure 3:
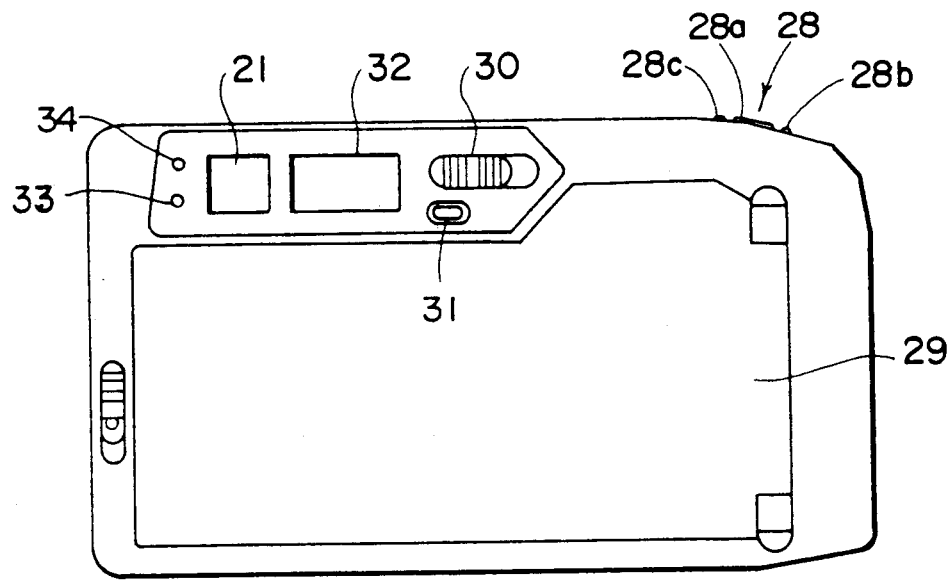

Located on an upper portion of the back of the camera body 25, as shown in FIG. 3, is a main switch 30, a mode button 31 and a LCD panel 32. The main switch 30 comprises a slide switch which has three positions and operates as a lock switch, SWL, and a macro switch SWM, which are described later.

A red indicator lamp 33 for indicating strobe information and a green indicator lamp 34 for indicating distance measurement information are arranged by the side of the finder 21.

Figure 4:
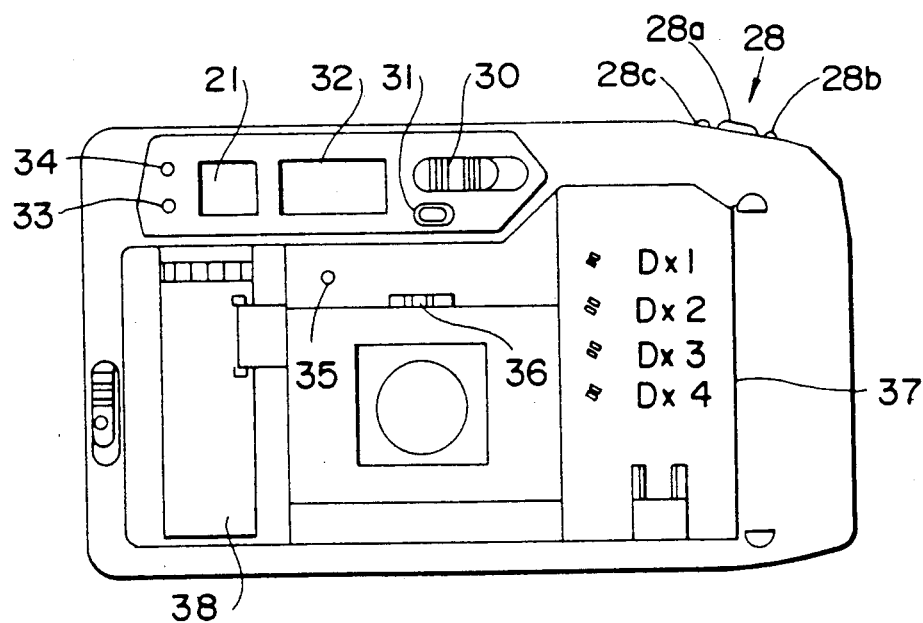

When a back cover 29 of the camera is opened, as shown in FIG. 4, an actuating member 35, to turn on and off a film switch (to be described below) which checks if a film is loaded in the camera, and a roller 36, which rotates upon the advancement of the film, are visible above an aperture. In addition, located in film cassette chamber 37, in which a film cartridge is seated, are four sets of Dx contacts Dx1, Dx2, Dx3 and Dx4, each set of which comprises two electrodes. Dx1 is a ground contact, and film speed values of ISO 25 through 3200 are detected by dividing it into 8 different zones, with 3-bit signals from the other three sets of contacts.

The camera operates by using a Dx code input system which reads the Dx code. The ON/OFF status of each contact Dx2-Dx3 with respect to Dx1 determines the ISO sensitivity, as shown in Table 1.

TABLE 1

| D × 4 | D × 3 | D × 2 | ISO |
|---|---|---|---|
| OFF | OFF | OFF | 25 |

TABLE 1-continued

| D × 4 | D × 3 | D × 2 | ISO |
|---|---|---|---|
| OFF | OFF | ON | 50 |
| OFF | ON | OFF | 100 |
| OFF | ON | ON | 200 |
| ON | OFF | OFF | 400 |
| ON | OFF | ON | 800 |
| ON | ON | OFF | 1600 |
| ON | ON | ON | 3200 |

Reference numeral 38 (FIG. 4) indicates a spool axis to wind thereon a film drawn from the film cartridge.

The camera automatically detects a variation of the focal length of the taking lens 11, an open F-value which changes according to the above variation and a position change of the lens 11 among the wide extremity, the tele extremity, a MACRO position for short-distance photography and a LOCK position, and carries out various controls according to these data.

For the above, a code plate is attached around a cam cylinder of the lens for detecting a movement of the lens, and several brushes, which contact the code plate, are arranged on the camera body. The information detected by the conducting conditions of these terminals are outputted as a position code POS.

In this camera, the focal length and the F-number of the taking lens 11 has a range of 38 mm and F4.5 - 60 mm and F6.7. The lens position detected from the position code POS is divided into fifteen steps of $O_H - E_H$. Here, "H" stands for hexadecimal and will be used for indication of the data to be described later.

When POS=$O_H$, the movable lens barrel 27 is retracted in the fixed lens barrel 26 and it is in the LOCK position, where the front of the taking lens 11 is covered by a barrier, not illustrated. POS=$2_H - C_H$ means the lens is in zoom range, and POS=$E_H$ means the lens is set to MACRO position for short-distance photography. Stopping of the lens 11 in the ranges between the LOCK position and zoom range (POS=$1_H$) and between the zoom range and the MACRO position (POS=$D_H$) is inhibited.

Figure 5:
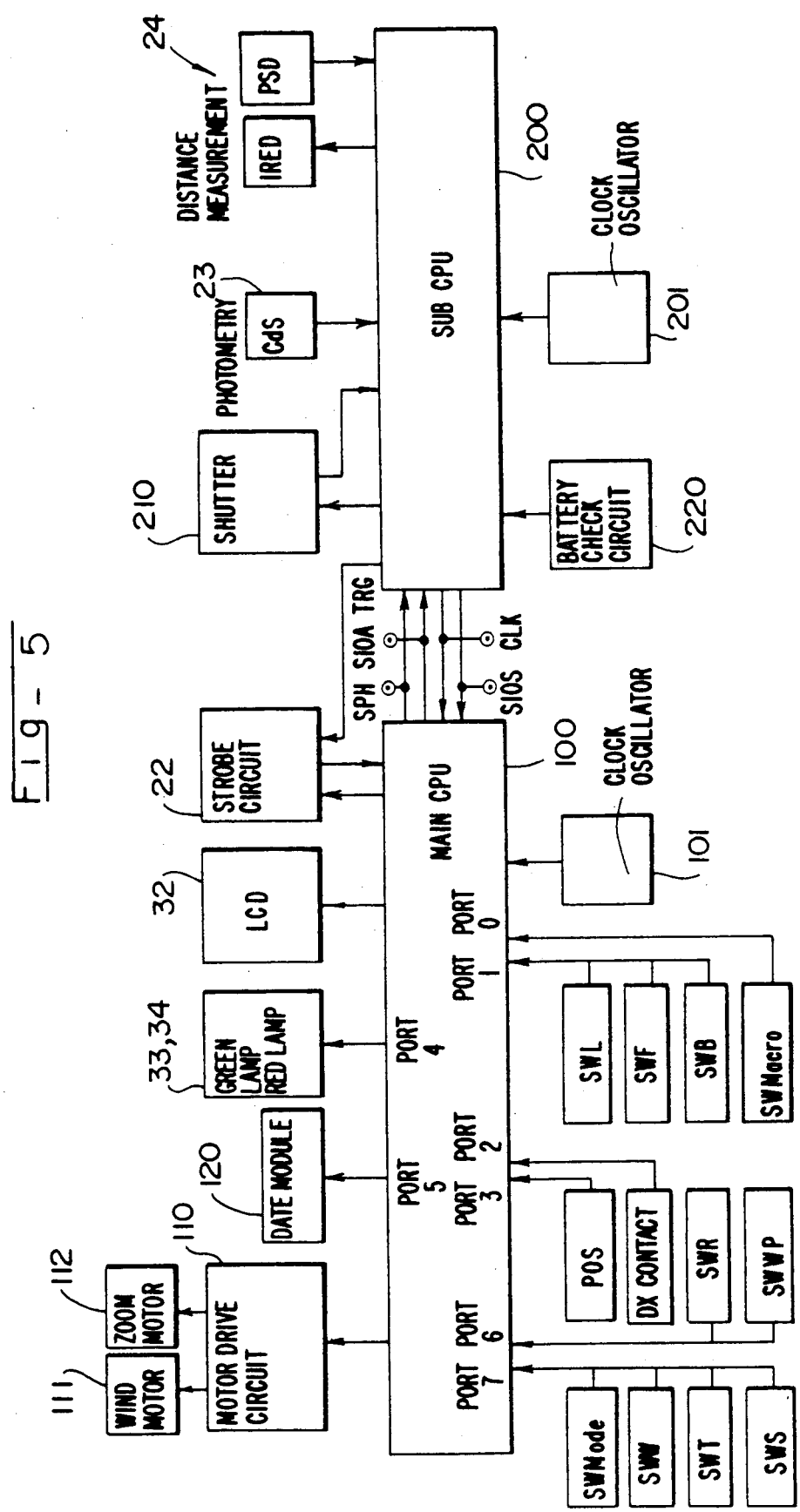
FIG. 5 is a block diagram of a control system of the camera of FIG. 1.

The control unit of this camera will now be explained, referring to FIG. 5.

A main CPU 100 is the core of the control unit. A sub CPU 200 is connected to the main CPU 100 via four signal lines, SPH, CLK, SIOA and SIOS, for shutter-related processings.

Each signal line has a terminal which can input and output signals to and from the exterior of the camera. Signals taken from each terminal during executing data transfers between the main CPU 100 and the sub CPU 200 have the following meanings:

SPH is a signal for the main CPU 100 to enable the sub CPU 200. Operation will start with a low signal "L". A high signal is represented by "H". CLK is a clock signal for transferring serial data which the sub CPU 200 outputs. SIOA is a signal for transferring serial data from the main CPU 100 to the sub CPU 200 and SIOS is a signal for transferring serial data from the sub CPU 200 to the main CPU 100. There terminals are also used for inputting and outputting data and commands with an external unit during externally-controlled processings, to be described later.

These data and commands are all inputted and outputted as 8-bit serial signals which are synchronized by the CLK signal.

As long as a battery is in the camera, the main CPU 100 operates all the time in synchronism with the clock signal CLK from the clock generating circuit 101, and controls other circuits in dependence on a switch input detected by the CPU 100 or the state of the camera.

Functions to be controlled include a motor drive circuit 100 for driving a winding motor 111 and a zoom motor 112, a date module 120 connected with PORT 5, a red indicator lamp 33 and a green indicator lamp 34 connected with PORT 4, the LCD panel 32, and the strobe 22.

Switches on the camera includes:

(1) Macro switch SWM, which is ON when the slide lever of the main switch 30 is set to the MACRO position;

(2) Battery switch SWB for checking whether a battery is present in the camera;

(3) Film switch SWF which changes from ON to OFF by operating member 35 that is pushed in when film is in the camera;

(4) Lock switch SWL, which is ON when the slide lever of the main switch 30 is set to the LOCK position;

(5) Wind pulse switch SWWP, which generates pulses in response to the rotation of roller 36 when film is advanced;

(6) Release switch SWR, which is ON when front part 28a of the shutter button 28 is fully depressed;

(7) Photometric switch SWS, which is ON when the front part 28a of the shutter button 28 is depressed halfway;

(8) Zoom tele switch SWT, which is ON when one end part 28b of the shutter button 28 is depressed;

(9) Zoom wide switch SWW, which is ON when end part 28c of the shutter button 28 is depressed; and

(10) Mode switch SWMode, which can be switched between a forced strobe flash and an automatic flash by pressing mode button 31.

Of these switches, the macro switch SWM is connected to PORT 0 of the main CPU 100, the battery switch SWB through the lock switch SWL are connected to PORT 1, the wind pulse switch SWWP and release switch SWR are connected to PORT 6, and the photometric switch SWS through mode switch SWMode are connected to PORT 7.

Furthermore, Dx contacts for inputting a Dx code is connected to PORT 2 of the main CPU 100, and the position code POS is sent to PORT 7 from the brushes that contact a code plate 13.

When power is supplied to the sub CPU 200 by the SPH, a "L" signal which is output from the main CPU 100, the sub CPU 200 will start operation in synchronism with the clock of a clock oscillation circuit 201 and performs the photometric, distance measurement and shutter-related processings while exchanging signals with the main CPU 100. This sub CPU 200 controls a shutter block 210, a battery check circuit 220, the photometric CdS cell 23 the distance measurement unit 24, and also generates trigger pulse TRG for the strobe 22 in synchronism with the shutter release.

A shutter block has been described in Japanese Patent Provisional Publication SHO 60-225122. Such a unit carries out focusing and shutter release by a built-in pulse motor.

The distance measurement unit 24 is also a well-known structure and is constructed with an infrared emitting diode IRED to emit light on a photographing subject and a position sensor PSD to receive light reflected from an object based upon a trigonometrical calculation.

The flowcharts shown in FIGS. 6 through 10, and the programs executed by the above-mentioned main CPU 100 will now be explained.

Main Program

FIG. 6 shows a main program which provides the basic operations of the camera. Other operations diverge from the main program are executed as subroutines called by the main program according to various conditions.

The main CPU 100 inputs the condition of each switch which was described above and stores the detected results in a memory at step 1 (hereinafter referred as S.1).

At S.2, the status of the switches are inputted again. This is to detect dynamic changes in switches by comparing data with the data stored at S.1.

At S.3, the condition of the lock switch SWL is checked according to the switch data input at S.2. The camera is held in a non-use state when the lock switch SWL is ON. In this case, whether the position code POS is "$O_H$" is checked at S.4. This is to check if the taking lens 11 is in the lock position. When it is in the lock position, processing advances to a LOCK Flow operation. When the lock switch SWL is ON in the Lock Flow, the zooming, photometric measurement, distance measurement and release operations are inhibited.

When the lens 11 is not in the lock position, a lens retracting process subroutine is called to retract the taking lens 11 to the lock position (S.5).

When the lock switch SWL is OFF, the following preparation processes for taking a photograph are carried out:

First, the condition of the macro switch SWMacro is checked at S.6. When the macro switch SWMacro is ON, the taking lens 11 has to be at the macro position for short-distance photography. Accordingly, the value of the position code PO; is checked at S.7. When POS=$E_H$, the taking lens 11 is already in the macro position, therefore, processing advances to S.19.

When POS is not equal to $E_H$, a Lens Macro Processing subroutine is executed to move the lens out (S.8), and then processing returns to the start of the main program.

When the macro switch SWMacro is OFF at S.6, the taking lens 11 has to be in the range of POS=$2_H$-$C_H$, that is the zoom area. The position code POS is thus checked to determine whether it is greater than $2_H$ at S.9. If POS is less than $2_H$ (POS=$O_H$ or $1_H$), the taking lens 11 is in the lock position or on the border of the lock position and the zoom area. Therefore, a Lens Drive Process subroutine is called, wherein the lens is moved out until POS=$2_H$.

Next, whether the position code POS is less than or equal to $C_H$ is checked at S.11. When POS is greater than $C_H$, the taking lens 11 is in the macro position or n the boarder of the macro position and the zoom area. Therefore, the Lens Retracting Process subroutine is executed, wherein the lens is moved back to the point where POS=$C_H$.

When the lens 11 is in the zoom area or is moved to the zoom area by the execution of S.10 or S.12, the status of the zoom wide switch SWW is checked at S.13.

When switch SWW is ON, the status of the lens 11 is checked at S.14. When the taking lens is already at the wide extremity, the lens 11 cannot move any further to the wide side. Therefore, processing goes to S.19. When the lens 11 is not at the wide extremity, the lens 11 is moved to the wide extremity at S.15 by executing a wide processing subroutine. In the Wide Processing subroutine, lens movement stops when the wide switch SWW is turned OFF or the lens 11 reaches the wide extremity. Then processing returns to the tart of the main program.

When the wide switch SWW is determined to be OFF at S.13, the status of the zoom tele switch SWT is checked at S.16.

When the tele switch SWT is ON, the position code POS is checked at S.17. When POS is equal to $C_H$, the taking lens 11 is already at the tele extremity where the focal length is 60 mm. Therefore, processing jumps to S.19.

When POS is not equal to $C_H$, a Tele Processing subroutine is executed to move the lens to the tele extremity (S.18). In the Tele Processing subroutine, lens movement stops when the tele switch SWT is turned OFF or the lens 11 reaches the tele extremity. Processing then returns to the start of the main program.

When both the zoom tele and wide switches SWT, SWW are not ON, the status of the photometric switch SWS is checked at S.19 and if it is different from the value stored in the memory in S.1, the status of the photometric switch SWS is again checked at S.20. If the photometric switch SWS is changed from OFF to ON at S.20, processing goes to an AEAF operation to execute photometric, distance measurement and shutter release processings.

When there is no state-change of the photometric switch SWS or when it changes from ON to OFF, a 1 ms timer is set and started at S.21.

In S.22, the main CPU 100 detects whether the signal levels of the CLK, SIOA, SIOS, L and H, respectively. If it is determined that a signal has been entered to start an external control, processing goes to S.23. This state continues until the 1 ms time period is up. Thereafter, the main CPU 100 diverges to an External Control operation.

SIOS, CLK are "H" and SIOA is "L" when processing is executed according to the main program. If CLK is now forcibly turned to "L" from outside, the camera is designed to recognize that this is a external control mode. It should be noted that the 1 ms delay is done to prevent error operation due to external noises.

If it is determined in S.22 that CLK=H, SIOA=H or SIOS=L from the beginning, or one has turned negative before the 1 ms time period is up, the switch data stored in memory are rewritten to the data entered in S.2 and after stopping for 125 ms in S.25, processing loops back to S.2 for further execution.

External Control

Operation of the camera when the CPU 100 enters the external control mode will be described with reference to FIG. 7.

When the external control operations starts, the main CPU 100 executes data input and output with an external controller to be described later via CLK and SIOS signal lines. Such input and output signals consist of two sets of 8-bit serial signals.

A first 8-bit serial signal comprises a signal which the camera receives from the external controller, according to which it is determined whether a second 8-bit serial signal is defined as an output of the information owned by the camera to the external controller or as a control command from the external controller to the camera.

The first and second serial signals are shown in Table 2 and Table 3.

Table 2 shows an output mode state where the second serial signal is an output from the camera, the first serial signal being SIO IN I and the second serial signal SIO OUT. Table 3 shows an input mode state with the second serial signal is a control command for the camera, the first serial signal being SIO IN 1 and the second serial signal SIO IN as in Table 2.

TABLE 2

| Input mode | | | | |
|---|---|---|---|---|
| SIO IN 1 | | SIO OUT | | |
| 7654 | 3310 | 7654 | 3210 | |
| [PORT READ] | | | | |
| 1000 | 0000 | XXXX | dddd | PORT 0 READ: SWMacro |
| | 0001 | XXXX | dddd | PORT 1 READ: SWB, SWF, SWL |
| | 0010 | XXXX | dddd | PORT 2 READ: Dx code |
| | 0011 | XXXX | dddd | PORT 3 READ: Zoom code |
| | 0110 | XXXX | dddd | PORT 6 READ: SWWP, SWR |
| | 0111 | XXXX | dddd | PORT 7 READ: SWS, SWT, SWW, SWMode |
| [RAM READ] | | | | |
| 1aaa | aaa0 | dddd | dddd | aaa aaa0: 10-7E |
| | | | | dddd(b7-b4): Add + 1 DATA |
| a: address | | d: data | | dddd(b3-b0): Add DATA |

TABLE 3

| Output mode | | | | |
|---|---|---|---|---|
| SIO IN 1 | | SIO IN 2 | | |
| 7654 | 3310 | 7654 | 3210 | |
| [Shutter Control] | | | | |
| 0001 | 1010 | XXXX | XXXX | NOMAL released |
| | 1011 | XXXX | XXXX | Distance and light measure only, not released |
| | 100X | XXXX | XXXX | Distance and light measure passed and released |
| | 1110 | XXXX | XXXX | Exposure amount test (Dx ignored) |
| [RAM WRITE] | | | | |
| 0010 | dddd | aaaa | aaaa | aaa aaa: Add 00-FF dddd:DATA |
| | | | | aaaa aaaa=00-FF:RAM |
| | | | | Add=000-0BF: |
| | | | | aaaa(b7-b4)=C-F: |
| | | | | RAM Add=1E+aaaa(b3-b0) |
| [Output Control] | | | | |
| 0011 | 0XXX | 111X | 000X | Initial value |
| | | 011X | 001X | WIND MOTOR forward |
| | | 110X | 100X | WIND MOTOR reverse |
| | | 110X | 010X | ZOOM MOTOR forward |
| | | 111X | 001X | ZOOM MOTOR reverse |
| | 1XXX | XXXd | dddX | PORT 5, 4 OUT |
| | | | | XXXd dddX |
| | | | | b4:DTRG |
| | | | | b3:RLMP |
| | | | | b2:GLMP |
| | | | | b1:SPH |
| [Operation Control] | | | | |
| 100 | 0000 | XXXX | dddd | MOVE POS: dddd=POS(0-E) |
| | 0001 | XXXX | XXXX | INT POS: POS initilize |
| | 0011 | XXXX | XXXX | TSTREW: rewind start |
| | 0100 | XXXX | XXXX | TSTLD: loading start |
| | 0101 | XXXX | XXXX | TSTWD: wind start |

The output mode and the input mode are distinguished by bit 7 of the first serial signal SIO IN 1. The main CPU 100 of the camera executes processing in the output mode when bit 7 is 1 in the input mode when bit 7 is 0.

In FIG. 7, the CPU 100 examines whether or not CLK is "L" (S51) after executing a 500 ms wait subroutine in S50. If it is determined that CLK is "H", the camera is not externally controlled and processing advances to the start of the main program.

If CLK is "L", the main CPU 100 defines SIOS as "L" then turns it to "H" again after waiting 500 μs (S52). It then examines whether or not CLK is "H" in S53. It determines the camera is externally controlled when CLK is "L" and goes to the main program. If it is "H", input of the first serial signal SIO IN 1 is subsequently effected.

Since it is a prerequisite for starting this processing that SIOS is "H", a 500 μs pulse is generated at "L" of SIOS by virtue of the processing in S52.

Thus, the external controller is allowed to perform camera control functions when this pulse is detected and CLK initially set at "L" level is shifted to "H" level. The camera accepts external control only when such synchronization is effected.

In S54, the first serial signal SIO IN 1 is transferred from the external controller to the camera.

In S55, bit 7 is checked to determine if the first serial signal received is 1. As noted above, the state in which bit 7 is 0 corresponds to the input mode in which a control command is sent from the external controller to the camera as the second serial signal. In this case, the main CPU 100 stores the first serial signal in memory in S56 so that it can be used for later checking. A second signal is again input in S57. After this input processing, processing is stopped for 1 ms in S58. Thereafter, processing diverges to a command code processing operation, to be described later via S59.

Then bit 7 of the first serial signal is determined as 1 in S55, this state corresponds to the output mode in which data is sent from the camera to the external controller as a second serial signal. In this case, it is examined in S60 whether or not high nibbles, i.e., the higher-order 4 bits of the first serial signal are $8_H$. $8_H$ here is the binary code which corresponds to "1000".

As shown in Table 2, the case where the high nibbles of the first serial signal are 8 corresponds to the mode PORT READ in Table 2. In this case, the data at a port specified by the lower-order 4 bits of the first serial signal are set in S61 as the lower 4 bits of the second serial signal SIO OUT.

If higher nibbles of the first serial signal are not 8, the data at an address specified by the bit 6 - the bit 1 of the first serial signal are set as the lower 4 bits of the second serial signal SIO OUT, while the higher-order address data at the specified address are also set as higher-order 4 bits. This enables reading a RAM data at addresses 10H to 7FH.

In S63, the data set in S61 and S62 is generated as the second serial signal. The external controller is allowed to detect the state of the camera by reading this data.

After the above processing, the main CPU 100 stops processing for 1 ms in S64 and advances to S50 after it finds SIOS has turned to "H" in S65.

It is noted that some of the external control end terminals [EXCT END] indicated in S66 diverges from the command code processing to be described later has been finished.

Serial Inout/Outout Operation

FIG. 8 illustrates in more detail the data input/output processing between the camera and the external controller executed in S54, S57 and S63 in the external control processing mentioned above.

First, in the case of serial signal input processing "Serial IN" operation done in S54 and S57, the serial output data is set to $FF_H$ in S67, and the main CPU 100 sets a 10 ms timer in S68 to start the serial input/output operation.

In the case of serial output processing "Serial OUT" operation in S63, the main CPU 100 sets the 10 ms timer in S68 and permits output of the serial output data set in S51.

S69 checks whether the 10 ms timer has reached its time period. If the timer is not up yet, an examination is made in S70 as to whether the serial input/output operation has been finished. If the input/output is finished before the 10 ms time period is up, the main CPU 100 stops the processing for 100 μs in S71 and inhibits the serial input/output before returning to the External Control Flow operation for further processing.

If the 10 ms time period is up before the finishing of the input/output, the serial input/output is inhibited in S72, while a stack pointer is cleared to restore the nesting level of the subroutine. Processing then returns to the main program for further processing.

Command Code Processing Operation

FIG. 9 shows what processing is executed by the signal actually received from the external controller. This flowchart will be described with reference to Table 3.

S73 through S76 in this flowchart are for checking the higher-order 4 bits of the first serial signal SIO IN 1. They are successively checked from high-order to low-order to allow the CPU 100 to determine which one of the four stages of control shown in Table 2 is requested by the external controller for the camera.

First, when the higher order 4 bits is $1_H$, it indicates that a Shutter Control Process is requested. In this case, the lower order 4 bits of the first serial signal are to be stored in register STEST in S74.

It is examined in S77 whether bit 1 of the above 4-bit data is equal to 1. Bit 1 is set to 0 in response to a command to effect a shutter-release without performing light and distance measurements, as shown in the shutter control column in Table 3. In such a case, processing diverges in S79 to perform a AEAF Flow operation which operates only the shutter-release. If bit 1 is equal to 1, processing diverges to the AEAF Flow operation. In this operation, bit 0 and bit 2 of STEST are checked, though detailed description of the AEAF Flow is omitted herein. If bit 0 is 1, processing returns to the main program, after executing light and distance measurements without operating the shutter-release. If bit 2 is 1, the shutter-release is operated regardless of the state of the release switch SWR, ignoring strobe control processing and release lock processing, so as to conduct an exposure quantity test to be described below.

If the result of the test performed in S73 is negative, the high order 4 bits are examined in S74 to determine whether the first serial signal is $2_H$. If the result is affirmative, a RAM WRITE process is executed.

The address in the RAM to which data is to be written is represented by a three-digit hexadecimal indication and is determined by an 8 bit data of the second serial signal.

The second serial signal SIO IN 2 is checked to determine whether it is within a range of $00_H$ and $FF_H$. If the higher order 4 bits are 0 through B, that is $00_H$ through $BF_H$, the address in question is given within the range between $000_H$ and $0BF_H$ with the highest order digit set at 0.

If the higher order 4 bits of the second serial signal SIO IN 2 are between $C_H$ and $F_H$, the higher 2 digits are fixed at 1E, while the lowest order digit is determined by the lower 4 bits of the second serial signal SIO IN 2, so that the address is specified within a range of 16, i.e., between 1E0H aND 1EFH. This range is provided to store data for driving the LCD panel.

The processings in S81 through S83 specifies the address mentioned above. It is first examined in S81 whether the address specified by the higher order 4 bits of the second serial signal are within the data area for driving the LCD panel. If it is negative, the data sent by the lower order 4 bits of the first serial signal are written into the address specified by the 8 bit of the second serial signal. In S83, the data sent by the lower order 4 bits of the first serial signal is written into the address specified in the range between $1E0_H$ and $1EF_H$.

Upon the completion of writing the data, processing diverges (in each case) to S66 to perform an External Control operation mentioned above, in which it is checked whether control is to be executed again.

In S75 the higher order 4 bits of the first serial signal SIO IN 1 are examined to determine whether they are equal to 3H. If the result of the test is affirmative, an output control in Table 3 is to be executed.

In S84, bit 3 of the first serial signal SIO IN 1 is examined to see if it is equal to 1. If it is equal to 1, the main CPU 100, in S85, outputs to a signal through PORTS 4 and 5 in accordance with the 4 bit data from bit 4 to bit 1 of the second serial signal. Thereafter, processing diverges to S66 for performing the External Control operation.

Thus, bit 4 controls a date trigger output to the date module, bit 3 turns ON and OFF the red lamp, bit 2 turns ON and OFF the green lamp, and bit 1 outputs a SPH signal which represents a start operation for the sub CPU 200.

When bit 3 of SIO IN 2 is determined to be 0 (in S84), bit 4 of the second serial signal is set to 1 in S86 and data of bits 7 - 5 and bits 3 - 1 are set as a motor data, shown in Table 2. In S87, a motor control subroutine is executed to perform forward reverse rotation processing of the zoom motor and wind motor in accordance with the set data.

Processing continues until a motor stop and brake instruction is executed in S89, because of the determination that SIOS="H" in S88. When the motor control processing is completed, processing diverges to S66 to perform the External Control operation, in the same manner mentioned above.

If the results in S73 through S75 are negative, the higher order 4 bit of the first serial signal is examined in S76 to determine whether it is equal to $4_H$.

If it is $4_H$, operation controls listed in Table 2 start. Here it is determined what processing are to be executed in accordance with the value of the lower order 4 bits of the first serial signal SIO IN 1.

If in S90 the lower 4 bits of the first serial signal SIO IN 1 are determined to be equal to $O_H$, processing diverges to S91 to perform a MOVE POS (position code) operation. This operation is performed to move the taking lens 11 to the position corresponding to the position code POS specified by the lower order 4 bits of the second serial signal SIO IN 2.

If the lower 4 bits are determined to be equal to 1H in S92, processing diverges to S93 to perform an initialization of the position code (INT POS) operation. In the case where the position code POS are 15 steps (from $O_H$ to $E_H$) which are to be detected by a 3 bit code combination, the configuration must be such that the same code is shared by multiple position codes. In this case, the position code should be counted in response to changes in the codes, with the current position code being held constant. However, if the main CPU 100 is unable to recognize the current position code for some reason, the taking lens 11 must be moved to the position where the code and position codes are in a one-to-one correspondence or to the terminal end so that position code can be re-counted. The position initialization (INIT POS) operation is executed for this purpose.

IN S94, the lower 4 bits of the first serial signal are checked to determine if they are equal to $3_H$. If they are, a rewind processing (REW) operation is executed in S95.

Thereafter, the lower 4 bits are checked in S96 to determine whether they are equal to $4_H$ and in S98 whether they are equal to $5_H$. If the former is the case, a loading process (LD) operation is executed in S97, while in the latter case, a wind process (WD) operation is performed in S99.

If the judgments in S90 to S98 are all negative, and those in S73 to S76 are all negative, processing goes to S66 to perform the External Control operation.

Image Plane Exposure Quantity Inspection in a Camera

Explanation is now given to an inspection unit for inspecting the above explained camera using an external control program. Inspections of the image plane exposure quantity and of the operation of the camera will be described below.

FIG. 10 shows a block diagram of the inspection unit applied to inspect an image plane exposure quantity. In FIG. 10, numeral 300 indicates a camera, 301 is a controller, 302 an interface (I/F) circuit, 303 is a prober unit, 304 is a diffusion-surface luminous source for an image plane exposure meter, 305 is a metering section of the image plane exposure meter, 306 is a light-receiving section of the image plane exposure meter, and 307 are a plurality of operation input keys. In measuring the image plane exposure quantity, the camera is placed in exact opposition to the diffusion-surface luminous source 304, with the light-receiving section 306 located in the film plane of the camera 300. Light emitted from the diffusion-surface luminous source 304 is controlled to offer a certain range of brightness from the lowest to highest level. The prober unit 303 is controlled by the controller 301 and interconnects the camera 300 and the controller 301 to perform the exchange of information via the interface 302. Camera 300 thus carries out controls following the external control information. The light- receiving section 306 gives the output corresponding to the light received to a metering section 305 which in turn gives the measurement result to the controller 30.

The controller 301 starts, changes and terminates controls in response to the operation of an operation input key set 307, which consists of a START key, a NEXT key and an END key. The controller 301 executes the image plane exposure quantity inspection flow shown in FIG. 11 in response to the operation of the input key set 307.

When the START key is operated, the controller 301 gives an answer YES in S100, turning on a solenoid valve of the prober unit 303 (S101) and checking whether the camera 300 is connected with the controller 301 (S102). Processing for connecting the camera 300 with a power supply unit then takes place and a wait for about 1 second occurs until the camera starts its normal operation (S103). A flag FNG is set to 0 to check if the camera 300 is an acceptable one in terms of the image plane exposure quantity (S104). FNG=0 represents the camera is acceptable, while FNG=1 indicates the camera is unacceptable. The flag is set to FNG=0 in S104 to tentatively treat the camera 300 as an acceptable one.

The controller 301 then goes to S105 to set FCONT to 1, SOUT1 to $40_H$, SOUT to $02_H$. FCONT is a flag to check if data should be sent to the camera 300. FCONT being equal to 1 represents the state in which data is sent to the camera 300, while FCONT being equal to 0 represents the state in which data is sent from the camera 300 to the controller 301. SOUT being equal to 1 represents data being sent to the camera 300 in the SO1 IN 1 processing, while SOUT being equal to 2 represents data being sent to the camera 300 in the SIO IN 2 processing. "$40_H$" corresponds to "01000000", and represents the position move command MOVE POS, as shown in Table 2. "$02_H$" corresponds to "00000010", and represents the data for moving the zoom lens to POS equals 2. That is, data of "$40_H$" and "$02_H$" are commands to move the zoom lens toward the wide extremity.

After executing the processing in S105, the controller 301 goes to S106, where a camera control subroutine takes place. This camera control subroutine is executed following the flowchart shown in FIG. 12.

In the camera control processing, flags FERR is set to 0, SIOS is set to H and CLK is set to L in SI061, and a one-minute timer is started (S1062). Here, flag FERR checks whether any error has occurred in the information exchanged between the camera 300 and the controller 301. FERR being equal to 1 indicates the occurrence of an error while FERR being equal to 0 indicates no error. When SIOS equals H is set in the camera control subroutine, the main CPU 100 of the camera 300 goes to the External Control Operation, shown in FIG. 7. After processing the 500 μs wait in S50, processing goes to S51 to check whether CLK equals L. Since CLK is set to L in the processing of S1061, S51 gives an answer YES and processing goes to S52. SIOS equals 1 processing is done in S52. Since there is a processing wait of 500 μs as it goes from S50 to S52, SIOS is turned from "H" to "L" by means of S52, processing after 500 since CLK=1 has been set as shown in (a) of FIG. 13. At the same time, setting SIOS to H is effected in S52, after waiting for 500 μs. On the other hand, the controller 301, in S1063, checks if the time is up, repeating the loop of checking if SIOS equals 1 in S1064 and S1065 and waiting until SIOS is turned to "L". Since SIOS is normally set to "L" in 1 second (in S52), the controller 301 gives an answer YES in S1064 and goes to S1065, setting CLK to H. Consequently, CLK is turned to "H" with some delay after SIOS is "L", as shown in FIG. 13(b). If SIOS does not equal L after 1 second, the occurrence of an error is assumed and processing goes to S1065, setting FERR to I before going to S107. If no error occurred, on the other hand, the answer YES is given in S57 of the External Control operation in the camera 300, so that processing goes to S54 where it is ready to execute the SIO IN 1 instructions.

The controller 301 then goes to S1066, starting the 1 ms timer, checking if the time is up and if SIOS is equal to H (S1067 and S1068). If SIOS is not "H", S1067 and S1068 are repeated. In the meantime, SIOS is set to H in the External Control Operation in the camera 300, after waiting for 500 μs in S52. As a result, SIOS is turned to "H" 500 μs after it goes "L", as shown in FIG. 13(c). When the time is up to give an answer YES in S1067 during executing S1067 and S1068 of the camera control processing, FERR is set to 1 and processing goes to S107. Since SIOS equalling H is usually set within 1 ms, the answer YES is given to go to S1069 where the processing stops for 500 μs, before going to S1070.

The controller 301 executes the setting of FOUT to 1, DATA equals SOUT1 in S1070, then going to S1071. In S1071, a serial IO call subroutine (SIO) takes place, as shown in FIG. 14.

In the SIO call subroutine, n equals 8 is set in S2000 and processing goes to S2001, where SIOS is set to H before going to S2002 to set CLK to L before going to S2003. Here, CLK is changed from "H" to "L", as shown in FIG. 13(d), because of the first setting of CLK to L in S2002. It is examined in S2003 whether flag FOUT is set to 1. If FOUT equals 1 in S2003, processing goes to S2004 to check if SDATA bit (n−1) equals 1. Since n equals 8 here, the data at bit 7 is examined. If bit 7 data is "0", processing goes to S2006, while if it is "1", it goes to S2006. The bit 7 data "1" or "0" is thus transferred. The controller 301 then goes to S2008, after waiting for 50 μs in S2007. After setting CLK to H in S2008, processing goes to S2009 to check whether FOUT is equal to 1. If the answer is yes, processing goes to S2010, and if no, processing goes to S2011. After processing goes to S2014, where n equals n−1 processing is executed, before going to S2015 to check if n equals 0. n equals 6 after the first processing is completed. Thus, processing goes to S2002 to again set CLK=L. The output data of bit 6 is thus executed in this process.

This process is repeated 8 times, after which an affirmative answer is given to the test performed in S2015, whereby the 8 bit data is transferred from the controller 301 to the camera 300. The controller 301 thus terminates this processing, returning to S1072. After waiting for 1 ms in S1072, the processing goes to S1073.

With FOUT equal to 0, the answer NO is given in S2003, so that S2004, S2005 and S2006 are skipped over and S2007 is performed, where a 50 μs wait period takes place. After setting CLK to H in S2008, processing goes to S2009 and then to S2010 to check if FOUT equals 1. In S2010, the setting of SDATA bit (n−1) equal to 0 takes place, which is followed by S2011, where SIOS is examined. If SIOS equal 1 in S2011, processing goes to S2013 after S2012, while if the answer is NO, it goes to S2013. In S2012, the setting of SDATA bit (n−1) to 1 takes place. Thus, 1-bit data is sent to the controller 301 when the steps from S2010 to S2012 are executed By repeating these steps 8 times (because n=8), the 8-bit data is received by the controller 301.

S1073 checks if FCONT equals 1. Since the data here is sent to the camera 300, the answer YES is given in S1073. Processing thus goes to S1074 to set FOUT to 1 and SDATA to equal SOUT 2. The controller 301 then goes to S1075 to again execute the S10 call subroutine. Thus, the SIO processing, shown in FIG. 15, is executed again to send data to the camera 300. After sending a command code and data to the camera 300, processing goes to S1076, where SIOS is set to "L" before proceeding to S107. If answer NO is given in S1073, processing goes to S1077 to set FOUT to 0, then to S1078 to execute the SIO call subroutine, which is followed by S1079 wherein SIN is set equal to SDATA.

The data is sent from the camera 300 to the controller 301 by means of steps S1077 to S1078.

In S107, a light intensity adjustment for the luminous source 304 is carried out. With the luminous source 304 set to a light value LV of 9, processing goes to S108. FCONT is set to 1, SOUT is set to $20_H$ and SOUT2 is set to $45_H$ in S108. Here, $20_H$ is RAM WRITE, as shown in Table 3 and $45_H$ specifies an address, whereby Add equals $045_H$ is specified. The data "dddd" is thus written into this Add equals $045_H$. This data is dddd equals 0000, which represents that the camera mode is set to an auto mode. Thereafter, the controller 301 executes the camera control subroutine shown in FIG. 12 (S109). A data "0000" is written into Add equals $045_H$ of the camera RAM by means of this camera control processing.

The controller 301 then goes to S110, where FCONT is set to 1, SOUT1 is set to $24_H$ and SOUT is set to $4A_H$. This is done to write the data of $4_H$ into Add equals $04A_H$. Processing then goes to the camera control subroutine (S111) where the ISO sensitivity information is written into the camera 300. The data corresponding to the lower bits 3 to 0 are written in this process. In S112, FCONT is set to 1, SOUT1 is set to $21_H$ and SOUT is set to $4B_H$. This is done to write the data of "$1_H$" into Add equals $04B_H$. The controller 301 then goes to S113 to execute the camera control subroutine. The data corresponding to the higher bits 7 to 4 is thus sent to the camera 300, and its contents are written into the RAM of the camera 300.

S114 executes the settings of FCONT to 1, SOUT to $1E_H$, and SOUT2 to $00_H$. "$1E_H$" is "00011110", which corresponds to an exposure quantity test command. The controller 301 then goes to S115 to execute the camera control subroutine. A release command is thus set in the camera 300. In S116, exposure quantity input processing takes place. The controller 301 compares the exposure quantity input data with an inspection standard and if it complies with the standard, it executes the same processing, changing the settings of the light values and the ISO sensitivity. When the answer NO is returned to the test in S117, FNG is set to 1 in S118' to perform exposure quantity inspections conditions specified by other standards (S118).

When all the exposure quantity inspections are completed, the controller 301 goes to S119 to turn OFF the power to the camera 300. Processing then goes to S120 to turn ON the solenoid valve so that the prober unit 303 is separated from the camera 300. Processing then goes to S121 to examine whether the set release is completed. After the set release is finished, processing goes to S122 to check if FNG equals 0. If FNG equals 0, processing goes to S123 to indicate an OK inspection result, while if FNG equals 1, it goes to S124 to indicate that the inspection result is NG (no good).

This completes the exposure quantity inspection for one camera.

Inspection Operation

The inspection operation will now be described with reference to FIG. 15.

S200 first examines whether or not the START key has been depressed. If the START key is found to have been pressed, in S200, processing for connecting the camera 300 to the power supply unit takes place and goes to S202 after waiting for one second. FON is then set to 1 and FCONT is set to 1 in S202. Here, FON equalling 1 stands for turning ON the LCD panel 32 and FON equalling 0 turns the LCD panel OFFf. After S202, the controller 301 sets Add to $F0_H$ in S203, before going to S204 where it is determined whether FON=1. If the answer YES is given in S204, processing goes to S205, while if the answer is NO, it goes to S206 SOUT1 is then set to $2F_H$ in S205, which is followed by the setting of SOUT1 to $10_H$ in S206.

The controller 301 then goes to S207 to carry out the setting of SOUT2 equals Add before executing the camera control subroutine (S208). The address specified by this subroutine is "1E" and the data to be transferred is determined by the lower 4 bits specified in S205 and S206. These data are sent to the camera 300 in the camera control process. The processing then goes to S209 to check if FERR equals 1. If there is an error in S209, processing diverges to an operation (S210) while if there is no error, processing goes to S211 to increment Add by 1.

Whether carry CY is set to 1 is then examined in S212. Carry CY is a flag indicating a shifting up from the highest order bit of the register, representing 0 if there is no shift-up, and 1 if there is a shift-up.

With CY equal to 0, processing goes to S207 to repeat steps S207, 209, 211, 212. When CY equals 1 in S212, processing goes to S213. The reversing of FON is executed in S213, after waiting for 500 ms. Thus, FON equals 0 is set if FON equals 1, while if FON equals 0, FON is set to 1. The controller 301 then goes to S214 to check if the END key has been operated. If the answer is YES, processing goes to S210, and if NO, processing goes to S215.

S215 examines whether the NEXT key has been operated. If the answer is NO, processing goes to S203 to repeat the blinking of all the segments of the LCD. If the answer YES is given in S215, processing goes to S216, where FON is set to 1 and FCONT is set to 1. The controller 301 then goes to S217 to check if FON equals 1. If FON equals 1, processing goes to S217. If FON is 1, processing goes to S219. In S218, SOUT1 is set to $F3_H$ before going to S220, while SOUT2 is set to $FF_H$. $FF_H$ is executed in S219, which is followed by S220. The controller 301 then executes the camera control subroutine in S221. Data output control PORT 5,4 OUT is done by "$38_H$" of SOUT1, "00" at bit 3, bit 2 being determined by SOUT2 equalling $F3_H$ in S218 and "11" at bit 3, and bit 2 by SOUT2 equalling $FF_H$ in S219. The data is thus sent to the camera 300 in the camera control subroutine.

S222 checks if FERR is equal to 1. If the answer is YES, processing goes to S210 and if NO, processing goes to S223. In S223, the reversing of FON is executed after waiting for 250 ms (S223). In S224, it is determined whether the END key has been operated. If the answer is YES, processing goes to S225 and if the answer is NO, processing goes to S210. S225 checks if the NEXT key has been operated. If the answer is NO, processing goes to S217 to repeat steps S217 through S225. Simultaneous blinkings of the red lamp and green lamp are thus repeated at an interval of 2 Hz.

If an answer of YES is given as to whether the NEXT key has been operated, processing goes to S226, where FON and FCONT are each set to 1. The controller 301 then goes to S227 to check if FON equals 1. If the answer YES is given in S227, processing in S228 is executed, while if the answer is NO, processing goes to S229. In S228, SOUT2 is set to $0B_H$ and in S229, SOUT2 is set to $02_H$.

The controller 301 then goes to S230 to set SOUT1 to $40_H$ before executing the camera control subroutine.

MOVE POS for operation control is specified by SOUT1 equals $40_H$. POS equals B by SOUT2 equalling $0B_H$ and POS equals 2 by SOUT2 equalling $02_H$. These data are sent to the camera 300 by the camera control subroutine (S231). After executing the camera control subroutine, the controller 301 goes to S232 to check if FERR equals 1. If it is equal to 1, processing diverges to S210 to perform the END operation. If FERR is not equal to 1, processing for the reversal of FON is executed, after waiting for 1 second, which is followed by S234 to check if the END key has been operated. If it has been operated, processing goes to S210, while if it has not been operated, processing goes to S235. S235 checks whether the NEXT key has been operated. If the answer is NO, processing goes back to S227, repeating steps S227 to S235. Thus, the alternate forward and reverse rotation of the zoom motor is repeated to reciprocate the zoom lens between the tele extremity of POS equals B and the wide extremity of POS equals 2.

If the answer to the test in S235 is YES, processing goes to S236, where FON and FCONT are both set to 1. The controller 301 then goes to S237 to check if FON equals 1. If FON equals 1 in S237, processing goes to S238, while if FON equals 0, processing goes to S239. S240 sets SOUT to $30_H$. Output control is specified by SOUT1 being equal to $30_H$, and the forward rotation of the wind motor is specified by SOUT2 being equal to $73_H$, and reverse rotation of the wind motor is specified by SOUT2 being equal to $D9_H$. The controller 301 then goes to the camera control subroutine in S241, whereby these data are sent to the camera 300. Processing then goes to S242 to check if FERR equals 1. If it does equal 1, processing goes to S210, but if it is not equal to 1, processing goes to S243. In S243, processing for the reversing of FON is executed, after a 2 second wait, before going to S244. S244 checks whether the END key has been operated. If the answer is NO, processing goes back to S237, repeating steps S237 to S244. In the case where the END key is not operated, the execution command to the camera 300 gives a data corresponding to the forward and reverse rotation at an approximate interval of 2 seconds. If the answer is YES to the test performed in S244, processing goes to S245 to turn OFF the power of the camera 300 to terminate the operation inspection.

As has been described above, according to the above embodiment, the camera can be controlled externally in the manner described above so that the main CPU operates in response to execution commands which are externally given, thereby facilitating the inspection of and the changing of the operation contents of the camera.

Second Inspection System

The above camera has a second inspection system in addition to the one described above.

FIG. 16 is a flowchart of the Main Program, disclosing the instructions relating to another inspection system. It should be noted that only one Main Program is executed in the above camera 300, and the flowchart illustrated in FIG. 6 also discloses the instructions relating to the first inspection system.

In the Main Program illustrated in FIG. 16, when there is no change in the state of the photometric switch SWS, or when it changes from ON to OFF (S.19), it is determined whether a charging of the battery for the strobe 22 is required by accessing a battery requirement flag $F_{CHGRQ}$ in S.2021. When this flag is set to 1, a battery charging subroutine is executed at S.2022.

Whether the battery charging is completed is checked at S.2023.

When the result at S.2023 is NG, for example, when the battery charging is not completed within the scheduled period because the supply voltage is low, processing diverges to an error process operation, which is not illustrated. When the result at S.2023 is OK, the battery requirement flag $F_{CHGRQ}$ is set to 0 at S.2024 and processing proceeds to S.2025.

When battery charging is not required at S.2021, the processing goes directly to S.2025. The other instructions in this main flow are substantially the same as those of FIG. 6.

Main CPU : AEAF flow

Next, the AEAF instructions carried out by the photometric, distance measurements and release system processing, which diverge from S.2020 of the main program is explained.

By transferring serial data, this process is carried out with the sub CPU 200, which is described later. Therefore, an explanation is given while referring to the timing chart in FIG. 21, which shows the flow of both processes.

Data transfer is synchronously carried out with the clock CLK (1)–(9) output from the sub CPU 200, as shown in FIG. 21. The transferred data consists of 8-bit serial signals; their details being explained in Table 4.

Also, in the following explanation, the signal output from the main CPU 100 to SIOA is referred as SA and the signal output from sub CPU 200 to SIOS is referred to SS.

When the processing is started, the main CPU 100 switches ON the power of the sub CPU 200 by setting SPH to "L" at S.2050. When the sub CPU 200 is switched ON the main CPU 100 stops processing for 10 ms to avoid superimposing noise on the CLK and SIOS signals.

Main CPU 100 detects the level of SIOS at S.2051. When it is "L", processing goes to the subroutine at S.2052. When it is not "L", the main CPU 100 sets SPH to "H" at S.2054 before diverging to the error processing operation.

At S.2052, by synchronizing with (1) CLK, the main CPU 100 outputs an error code to SIOA signal line as serial output (1) SA, and also inputs the result BCK of the battery check output from the sub CPU 200 from the SIOS signal line as a serial signal (1) SS.

TABLE 4

| No. | SIOA | SIOS | SPH |
|-----|------|------|-----|
| (1) | Error code Table 2 | Battery check | ☉ |
| (2) | DATA EXP | DATA AFDATA | |
| (3) | DATA POS & Dx | DATA BvDATA | ☉ |
| (4) | DATA LLDATA | | |
| (5) | DATA EvDATA | | |
| (6) | DATA AvDATA | | ☉ |
| (7) | ANUL OR REL | | |
| (8) | | RLEXC | |
| (9) | | WIND | |

TABLE 5

| | | |
|---|---|---|
| 40 H - 5 FH | Serial IO error | |
| 80 H - 87 H | Zoom code change | b.2 — 0 = Abnormal code |

TABLE 5-continued

| | | abnormal | |
|---|---|---|---|
| 88 H - 8 FH | Zoom time-up error | b.2 − 0 = | Zoom code |
| 90 H - 97 H | Telephoto or wide end error | b.2 − 0 = | Zoom code |
| 98 H - 9 FH | Zoom position error | b.2 − 0 = | Zoom code |
| COH | Rewind error | | |

This serial input/output processing is performed by hardware, so in the processing in the software of the main CPU, as shown in FIG. 18, an error code is first set to the register for a serial output at S.2090, and then serial input is enabled at S.2091 and clock generation of the sub CPU 200 is also enabled when SIOS is set to H at S.202.

After this, if CLK is inputted, data is automatically output 1 bit at a time to the SIOA signal line synchronized with CLK, and the data is set 1 bit at a time to the serial input register from the SIOS signal &line, as shown in FIG. 22. Software in the main CPU 100 waits for the end of the serial input/output at S.2093. When it finishes the main CPU 100 inhibits the serial I/0 and sets SIOA to L to read the data from the serial input register as the results of the battery check (S.2094).

Error codes include the various information shown in Table 5, which are not required to control the sub CPU 200. By connecting the external unit, to be described below, it can detect various kinds of errors caused in the camera without any special operation.

The main CPU 100 judges the result of the battery check which is inputted at S.2053 and diverges to the error processing operation via S.054 when the battery voltage is insufficient to continue processing.

AT S.2055, the main CPU 100 outputs a SPH pulse NO. 1 of 500 μs to SPH. This pulse functions to transfer the signal to the sub CPU 200 to carry out the processing after the battery is checked.

At S.2058, the Dx code is input from the Dx terminal and this code is converted into ISO sensitivity Sv (Apex display; hereinafter displayed in the same way) of the film.

At S.2057, a lens position code POS is inputted from terminal ZC and converted to a variation alpha (α) value of the open F number of the focal length for taking photographs.

The main CPU 100 outputs EXP to SIOA as (2)SA at S.2058, and also inputs distance measurement information AFDATA as (2)SS, which the sub CPU 200 outputs to SIOS.

EXP is data showing the accumulated number of photographs taken by the camera, and this data is not required for the sub CPU 200. For example, if 10 frames are programmed as 1 bit, the data of each 10 frame between frame 0 and frame 2,560 can be output to be monitored outside the camera.

At S.2059, with the AFDATA of (2)SS, a LL (lens latch) calculation is carried out by a lens latch (LL) subroutine to determine how much the lens should come out.

At S.2060, the main CPU 100 outputs a zoom position code POS and Dx information as (3)SA, and also inputs subject brightness information BvDATA as (3)SS.

The (3)SA also represents data which is not needed by the sub CPU 200, so it is not necessary to be transferred.

At S.2061, an AEFM (auto exposure, Flashmatic) calculation subroutine is called to define an exposure value Ev or diaphragm value Av according to the above data.

At S.2062, the battery requirement flag $F_{CHGRQ}$ is checked. When this flag is 1, the main CPU 100 sets SPH to $H_i(S.63)$ and the signal is transferred to the sub CPU 200 to discontinue processing. Thereafter, processing returns to the main program.

At S.2064, a SPH pulse NO.3 of 500 μs duration is outputted. S.2064 functions to transfer the signal to the sub CPU 200 to continue the process.

After outputting SPH pulse NO.3, the main CPU 100 outputs lens latch data LLDATA as (4)SA at S.2065, exposure data AEDATA as (5)SA at S.2066 and Flashmatic data as (6)SA at S.2067 to SIOA.

At S.2068, switch data is inputted. According to this data, the following judgments are carried out:

First, the release switch SWR is checked to see if it is ON at S.2069, whether the photometric switch SWS is ON at S.2070 and the lock switch SWL is ON at S.2071. When the release switch SWR is OFF, the photometric switch is ON and the lock switch is OFF, the main CPU 100 outputs SPH pulse NO.6 at S.2072 and also outputs command ANUL as (7)SA to SIOA at S.2073. Processing then loops between S.2068 and S.2073 until the release switch is turned ON. In this case, the sub CPU 200 will be in the waiting state.

While the main CPU 7100's processing goes into a loop if the photometric switch SWS is turned OFF or the lock switch SWL is turned ON, the main CPU 100 sets SPH to "H" at S.2074 and then, processing returns to the main program.

When the release switch is ON, the main CPU 100 outputs SHP pulse NO.6 of a 500 μs duration at S.2075 and command REL as (7)SA which is an exposure command, at S.2076.

Next, the main CPU 101 outputs dummy data (8)SA, which has no particular meaning, at S.2077, and also inputs (8)SS which is outputted from the sub CPU 200. A determination is then made as to whether (8) SS is equal to command RLEX at S.2076.

At S.2079, whether the strobe 22 has flashed for taking a photograph is checked. When the strobe 22 was flashed, the battery requirement flag $F_{CHGRQ}$ will be set to 1 to charge the battery at S.2080.

At S.2081, dummy data (9)SA is outputted and (9)SS is inputted. At S.2082, whether (9)SS is a command WIND, requiring film winding, is checked. When scheduled commands were not transferred at S.2078 and S.2082, SPH is set to "H" at S.2083 and the error processing operation will be carried out.

When the scheduled commands have been transferred, the main CPU 100 sets SPH to "H" at S.2084, increments the accumulated number of photographs that have been taken and diverges to a winding operation to wind the film by one picture frame.

A detailed explanation of this winding process is not given. However, processing goes to the main program when the winding is correctly finished. When the winding is not completed in the scheduled time, the rewinding process will be carried out.

(Sub CPU : Main Flow

Next, the operation of sub CPU 200 will be explained according to the flowchart in FIG. 19 and the timing chart in FIG. 21.

When the main CPU 100 sets SPH to "L" , the sub CPU 200 performs a power hold at S.300 and transfers the signal to inform the main CPU 100 that the operation has started by setting SIOS to "L".

Next, at S.301, the sub CPU 200 checks the voltage of the battery using the battery check circuit 220, and outputs the checking results as data (1)SS to SIOS, which is synchronized with the built-in clock (1) CLK, at S.302. The timing of the clock generation and the data input/output is shown in the serial I/0 flow in FIG. 20.

In the serial I/O flow of the sub CPU, counter n is set to 8 (S.350) and processing flows to S.351. At S.351, CLK is set to "L" and processing flows to S.352. At this step, CLK is changed to "L" from "H", as shown in FIG. 12.

At S.352, flag $F_{OUT}$ is checked. This flag is set to 1 when the sub CPU 200 outputs data for serial I/0 processing and is set to 0 for input.

First, $F_{OUT}$, which is when the sub CPU 200 outputs serial data, is explained.

In this case, processing goes to S.353 to check if bit (8−n) of the serial output data is equal to 1. At the beginning of this flow, n equals 8, therefore, bit 0 of the output data is checked first. When bit 0 of the data is "0", processing goes to S.354 to set SIOS to "L". When bit 0 of the data is 1, processing goes to S.355 to set SIOS to "H".

With the above processing, data 1 or 0 of bit 0 will be outputted to SIOS. Sub CPU 200 sets CLK to "H" at S.357, after discontinuing the processing for 50 μs at S.356.

At S.358, $F_{OUT}$ is checked again to determine if it is equal to 1. When $F_{OUT}$ is 1, processing goes to S.359, wherein a 50 μs wait is incurred before proceeding to S.360 to subtract 1 from the n counter and checks whether the n counter is 0 (S.362). After one repetition of the above processing, n will be equal to 7, so the processing returns to S.351 and CLK is set to "L" again. With this processing, the data output of bit 1 will be carried out.

When this processing is repeated eight times, the test at S.361 will indicate that n is equal to 0. Thus, the sub CPU has output 8 bits of serial data. The sub CPU finishes this serial I/0 processing and returns to the main program to continue processing.

When $F_{OUT}$ equals 0, that is sub CPU inputs serial data, processing skips S.353, S.354 and S.355 and goes to S.356 and S.358 to S.362. At S.362, bit (8−n) of the serial input data is set to 0, and SIOA is checked at S.363. When SIOA is "H", bit (8−n) of the serial input data is changed to 1 at S.364 and processing goes to S.359. When SIOA is "L", bit (8−n) is left as 0 and processing goes to S.359.

For the input case, the same as with the output, the above processing will be repeated eight times until n equals 0 and an 8-bit serial signal will have been inputted to the sub CPU.

When the processing returns to the main program of the sub CPU, the SPH pulse NO.1 output from the main CPU 100 will be checked at S.303.

Sub CPU 200 measures the distance to the subject by controlling the distance measurement unit 24 at S.304, and outputs the distance measurement data AFDATA as (2)SS, according to the above serial I/0 flow synchronized with (2) CLK.

Next, the sub CPU 200 measures the brightness of the subject with the output of the CdS cell 23 at S.306, and also outputs brightness data BvDATA as (3)SS synchronized with (3) CLK at S.307.

At S.308, the sub CPU 200 checks the SPH pulse NO.3.

Sub CPU 200 outputs (4) CLK at S.309 and also inputs lens latch data LLDATA, which is output from the main CPU 100, as (4)SA. It also outputs (5) CLK at S.310 and inputs the exposure data AEDATA, which is output from the main CPU 100, as (5)SA. Moreover, it outputs (6) CLK at S.311 and inputs Flashmatic data FMDATA which is output from main CPU 100 as (6)SA.

At S.312, the shutter speed or diaphragm data is set according to the above AEDATA or FMDATA and processing goes to S.313 to check SPH pulse NO.8.

At S.314, the sub CPU 200 outputs (7) CLK and inputs (7)SA, which is outputted from the main CPU 100. (7)SA is transferred as command ANUL until the release switch is turned ON. When the release switch is ON, command REL is superimposed. At S.3115, processing repeats between S.313 and S.315 while waiting for the command REL to be superimposed.

When the command REL is transferred, the sub CPU 200 outputs command RLEXC to (8)SS, as well as (8) CLK, at S.316, and moves the lens out to the focal position specified in S.317 according to the transferred lens latch data, to carry out an exposure control at S.318.

After this, the sub CPU 200 moves the lens back to its initial position (S.319), and outputs a winding required command WIND as to (9)SS, as well as (9) CLK, at S.320.

Finally, the sub CPU 200 turns OFF the power hold at S.321 to finish the processing.

Next, an explanation of a monitor to check the camera will be given.

Monitor Unit

The monitor unit is constructed with a data reading circuit which is equipped with terminals to connect to each of the SPH, SIOA, SIOS and CLK contacts, and a display section such as a CRT, etc., which displays data through connection to the reading circuit. In checking the camera, by connecting each terminal to the camera contacts, data output from the camera can be monitored by operating the camera, as when taking a photograph.

The leading edge of CLK, shown in FIG. 22, is the timing point to read data.

FIG. 23 is a flowchart showing the operation of this monitor.

When processing starts, monitor unit clears counter C (which counts and displays the number of times reading data is communicated) at S.400, and counter E is set to 8 to specify the number of times serial data is to be read.

At S.401, SPH is checked. When it is set to "H", a 50 ms timer will start at S.402 and SPH is rechecked at S.403. When it is "H", it is determined whether the time is up at S.404. If SPH is "H" for 50 ms, processing will wait for SPH to become "L" at S.405.

When SPH is "L" from the beginning, or if it is set to "L" during the 50 ms delay, processing returns to S.401 to continue the process. This processing is carried out to avoid having the unit start processing by having SPH pulses intermittently generated when the photometric switch is continuously turned ON and OFF. If the processing was started with a SPH pulse, data could not be read from (1) in order, and the data which is read could not be judged, which can lead to mistakes in judgment.

When it is judged that the shutter button has not been pressed at S.404, processing in the camera starts by turning the photometric switch ON at S.405, and the processing waits for SPH to be set to "L".

When SPH is set to "L", processing is suspended for 10 ms at S.406 to avoid noise interfering with SIOS and CLK. The display on the CRT screen will disappear at S.407.

At S.408, register A, which stores the SA signal, register B, which stores the SS signal, are cleared, and counter D, which counts down the SA and SS signals 1 bit at a time, is set to 8.

At S.409, CLK is checked. When it is "L", processing goes to S.416, which will be described later. When it is "H", SPH is checked at S.410. When it is "L", that is, when the power of the sub CPU is not switched OFF, processing loops back through S.409 and S.410 until CLK is set to "L".

When SPH is judged to be "H" at S.410, counter F is set to 20 at S.411. After being suspended for 500 μs at S.412, SPH is rechecked at S.413. When the result is "H", 1 is subtracted from counter F at S.414. Thereafter, counter F is checked to see if it is set to 0 at S.415. When the processing detects that SPH is "H" for more than 10 ms, which is 20 times an interval of 500 μs, it judges that the photographer has released his finger from the shutter button. Therefore, it returns to S.400. By this process, even if SPH is "H", processing continues when the SPH pulse is superimposed.

When CLK is determined to be "L" at S.409, the data reading unit judges that the clock output for data transfer is started, and waits for CLK to be initialized and set to "H" at S.416. When CLK is set to "H", it inputs SIOA and SIOS from the lowest bit at S.417.

At S.418 and S.419, the logical sums of input SA signal and bit 0 of register A, and SS signal and 0 bit 0 of register B are stored as the 0 bit of each register.

At S.420 and S.421, the data of each bit of the counter is shifted to the right by one digit. By repeating this operation for 8 bits, data which is inputted as serial data can be stored in each register.

At S.422, 1 is subtracted from counter D and it is checked at S.423 to see if it is 0. Counter D is set to 0 after all serial signals for 8 bits are read.

When not all of the 8 bits of data have not been read, processing waits for CLK to be set to "L" at S.424. When it is set to "L", processing between S.416 and S.423 is repeated.

When counter D is set to 0, counter C is incremented by 1 (S.425), and, for example, counter C (communication times), register A (SIOS) or register B (SIOS) can be displayed on the CRT screen.

At S.427, 1 is subtracted from counter E and the counter is checked at S.428 to see if it is 0. When data specifying the number at S.400 has been completely read, processing returns to S.400 again. When data is being read, the processing loops to S.408 to continue the instruction sequence.

In this case the 8 serial data items corresponding to (1) CLK to (8) CLK of the camera for SIOA and SIOS are read and displayed.

As described earlier, the camera need not transfer data, but it outputs essential data to judge the condition of the camera to the interval of data transfer with respect to timing. Therefore, without any special controls, data can be read by the monitor unit described above and operations for each check can be easily done.

As has been described, according to the second inspection system, data requiring transfer and data requiring no transfer can be easily monitored by taking such data from signal lines of the camera with no extra control.

Also, with the arrangement for generating the type of errors in the electronic control system, operation abnormalities can be exactly classified to facilitate repairing failed products.

Third Inspection System

The above camera has a third inspection system in addition to the above two systems.

FIG. 24 is an "AEAF" flowchart that diverges from S20 of the Main Program of FIG. 6 and S.2020 of FIG. 16. It should be noted that only one "AEAF" flow is executed in the above camera 300, and the flowchart illustrated in FIG. 24 is to disclose the instructions relating to the third inspection system, while FIG. 17 is to disclose those relating to the second inspection system.

In this system, when the Dx code printed on the film cassette of the loaded film is ISO 3200 and the film switch SWF is ON, a leader section of the film is not pulled out of the cartridge, and the processing judges it to be a test mode to display the AF step based on the distance measurement data on the LCD panel. The LCD panel does not display the focal length or film numbers in the normal mode which is not included in the test mode.

When processing starts, the battery voltage is checked to determine if it is sufficient to continue processing (S.500). When the voltage is more than a specified value, distance measurement data based on the detected results of the AF unit is input at S.501. The distance measurement data is converted to one of 36 AF steps, from 0.5 m to infinity.

Next, at S.502, the photometric data based on the output of the photometric CdS cell, which measured the brightness of the subject, is input.

At S.503, the main CPU 100 reads the Dx code of the film cartridge loaded when the Dx contact is connected, recognizes the code as the film ISO sensitivity according to Table 1, and converts it into a film sensitivity value Sv (apex display).

At S.504, a LL (Lens Latch) calculation to acquire the amount of lens movement is carried out according to the AF step which is determined to correspond to the distance measurement data. The AF step is decided according to the distance measurement data. However, for a particular AF step, the value of the lens latch will be different when the taking lens is in the normal mode or the macro mode, so it is decided after considering this information.

At S.506, test flag $F_{TSTBLB}$ which shows that the processing is in the test mode, is cleared.

At S.506, whether the input Dx code input at S.503 corresponds to ISO 3200 (that is, if all Dx contacts were turned ON), is checked.

When an ISO 3200 film cartridge is judged to be loaded, the film switch SWF is checked at S.507. When this switch is OFF, that is, when film is not pulled out of the cartridge, test flag $F_{TSTBLB}$ is set at S.508, the presently displayed data on the LCD panel is stored in memory as backup data, and the AF step is displayed as the distance measurement data.

The above two conditions are required for processing to go to the test mode. However, ISO 3200 film is rarely used by users of a compact camera which is used in this example, and even when they use it, the film has to be pulled out. In this case the test mode won't be set, so there is no chance of the test function interfering with taking photographs.

In testing, whether the operation of the photometric unit is normal can be easily checked by simply preparing an ISO 3200 film cartridge.

At S.510, AE data to control the shutter speed is set to the bulb exposure mode and the Flashmatic (FM) data is set to NFL, which inhibits the flash. The bulb exposure mode is to open the shutter when the shutter button is pressed and to close it when the shutter button is released.

When an ISO 3200 film cartridge is not loaded, or a film cassette other than ISO 3200 is loaded at S.506, an AEFM calculation operation will be carried out at S.511, without any judgment at S.507.

Even if an ISO 3200 film cartridge is loaded, when the film is pulled out, the test mode does not start and AEFM processing will be carried out.

When the exposure value is sufficient and does not require a strobe emission, the shutter speed and diaphragm value are determined according to the AE calculation at S.511.

The main CPU 100 then transfers the LL data, AE data and FM data calculated at S.512, S.513 and S.514 to the sub CPU 200.

Thereafter, whether the release switch SWR is ON (S.515), whether the photometric switch SWS is ON (S.516) and whether the lock switch SWL is ON (S.517) are checked. When the photometric switch is ON and the lock switch is OFF, processing goes into a loop between S.515 and S.517 until the release switch is turned ON. When the release switch is turned ON, the exposure start signal is outputted to the sub CPU 200 at S.520.

When the photometric switch is OFF and the lock switch is ON, test flag $F_{TSTBLB}$ is checked at S.518. When it is in the test mode, at S.519, the LCD panel display is changed from the AF step to the normal display which is held in memory. When it is not in the test mode, the processing skips S.519 and returns to the main program.

When the release switch SWR is turned ON while the photometric switch SWS is ON and the lock switch SWL is OFF, the main CPU 100 outputs an exposure start signal to the sub CPU 200 (S.520). When this signal is outputted to the sub CPU 200, the sub CPU 200 moves the lens to the focus position according to the LL data, and controls the diaphragm and shutter speed according to the AE data, or controls the diaphragm and strobe according to the FM data and opens the shutter.

At S.521, test flag $F_{TSTBLB}$ is checked to see if it is 1. When this flag is 0, the main CPU 100 inputs an exposure end signal (S.522) and checks if the film has been pulled out at S.523. When the film is pulled out, winding to wind the film by one frame is carried out at S.524.

A detailed explanation of this winding process will not be given. However, when the winding is correctly completed, processing returns to the Main Program. When the winding is not completed in the scheduled time, the processing for winding will be carried out.

When the test flag $F_{TSTBLB}$ is equal to 1 at S.521, that is, when the processing is in the test mode, the judgment at S.525 is repeated until the photometric switch SWS is turned OFF. During this processing, the shutter is in the open position. Therefore, by opening the rear cover and positioning the frosted glass at the aperture, you can directly see a picture.

When the shutter button is released, a bulb close signal is outputted at S.526, and the LCD panel display is changed over to the information backed up in the memory. Thereafter, processing goes to S.522.

In the above example, the distance measurement unit is only described concerning the distance measuring method. However, other methods can be used; for example, displaying photometric unit data which measures the brightness of the subject can be described.

As has been described above, according to the third inspection system, measurement data, such as light intensity and distance measured, can be easily monitored by setting a test mode as part of a normal operation of the camera with no need for using an external inspection unit.

Furthermore, since the test mode is entered in dependence upon the state of the Dx code and film switch, testing can be accomplished without disturbing the user.

What is claimed is:

1. An electronically controlled camera, comprising:
   a plurality of control means arranged within a camera body of said camera;
   a plurality of signal lines arranged within said camera body which are interconnected between said control means for exchanging data between said plurality of control means in said camera body; and
   terminal means to which an external unit is connected, said terminal means being connected to at least one of said plurality of signal lines, wherein said external unit causes one control means in said camera body to send at least one predetermined data signal to another control means in said camera body via at least one of said plurality of signal lines, said predetermined data signal comprising data which is not required for a normal operation of said another control means.

2. The electronically controlled camera according to claim 1, wherein said predetermined data signal comprises data relating to types of errors that occurred in said control means of said camera.

3. An electronically controlled camera, comprising:
   means for measuring photographing data that varies in dependence upon external environments;
   means for reading a Dx code provided on a film cartridge used with said camera;
   means for detecting whether a film in said film cartridge loaded in said camera is withdrawn out of said film cartridge;
   means for visibly indicating said photographing data; and
   means for indicating said photographing data measured by said measuring means on said indicator means when said Dx code input means inputs a predetermined Dx code and said film detecting means detects that said film is not drawn out of said film cartridge.

4. The electronically controlled camera according to claim 3, wherein said photographing data measured by said measuring means comprises a subject-distance.

5. The electronically controlled camera according to claim 3, wherein said predetermined Dx code comprises a code for said film which is not normally used with said camera.

6. The electronically controlled camera according to claim 5, wherein said predetermined Dx code comprises an ISO code of 3200.

7. An electronically controlled camera, comprising:
a plurality of electronic control systems arranged within a camera body of said camera;
a plurality of signal lines arranged within said camera body that interconnect said electronic control systems for exchanging data between said electronic control systems in said camera body; and
means for connecting an external unit to said plurality of signal lines for transmitting a signal between said external unit and at least one of said plurality of electronic control systems in said camera body, wherein one electronic control system in said camera body sends a predetermined data signal to another electronic control system in said camera body via said plurality of signal lines in said camera body in response to said signal from said external unit, said predetermined data signal comprising data relating to the condition of said electronic control systems.

8. The electronically controlled camera according to claim 7, wherein said predetermined data signal comprises data relating to types of errors that occur in said plurality of electronic control systems.

9. An electronically controlled camera, comprising:
means for inputting a Dx code provided on a film cartridge used with said camera; and
means for indicating photographing data if a predetermined Dx code is inputted and a leader section of a film in said film cartridge is detected as not being withdrawn from said film cartridge.

10. The electronically controlled camera of claim 9, wherein said predetermined Dx code comprises an ISO code of 3200.

11. The electronically controlled camera according to claim 13, wherein said predetermined Dx code comprises a code for said film which is not normally used with said camera.

12. The electronically controlled camera of claim 11, wherein said leader section of said film in said film cartridge is detected as not being withdrawn from said film cartridge if said leader section is not advanced in said camera to at least a predetermined point along a film travel path of said film.

13. The electronically controlled camera of claim 9, wherein said leader section of said film in said film cartridge is detected as not being withdrawn from said film cartridge if said leader section is not advanced in said camera to at least a predetermined point along a film travel path of said film.

14. The electronically controlled camera of claim 9, wherein said photographic data comprises at least one of focal length information, film frame number information or distance measurement information.

15. The electronically controlled camera of claim 3, wherein said detecting means detects whether a leader section of said film is withdrawn from said film cartridge.

16. The electronically controlled camera of claim 14, wherein said film travels along a film path in said camera, said detecting means detecting whether said leader section of said film is advanced to a predetermined point along said film path.

17. The electronically controlled camera of claim 3, wherein said photographic data comprises at least one of focal length information, film frame number information or distance measurement information.

18. The electronically controlled camera of claim 1, wherein said terminal means are provided under a surface cover of said camera.

19. The electronically controlled camera of claim 7, wherein said connecting means are provided under a surface cover of said camera.

20. The electronically controlled camera of claim 18, wherein said terminal means are connected to said plurality of signal lines that are interconnected between said control means.

21. The electronically controlled camera of claim 20, wherein said predetermined data signal is sent when said plurality of control means are not exchanging data directed to a normal photographic operation of said camera.

22. The electronically controlled camera of claim 19, wherein said connecting means are connected to said plurality of signal lines that are interconnected between said control systems.

23. The electronically controlled camera of claim 22, wherein said predetermined data signal is sent when said plurality of control systems are not exchanging data directed to a normal photographic operation of said camera.

* * * * *